(12) United States Patent
Oshikubo et al.

(10) Patent No.: US 8,149,296 B2
(45) Date of Patent: Apr. 3, 2012

(54) SOLID-STATE IMAGE PICKUP DEVICE

(75) Inventors: Hiromichi Oshikubo, Hino (JP); Satoru Adachi, Tsuchiura (JP); Koichi Mizobuchi, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 307 days.

(21) Appl. No.: 12/469,243

(22) Filed: May 20, 2009

(65) Prior Publication Data
US 2009/0295973 A1 Dec. 3, 2009

(30) Foreign Application Priority Data

May 20, 2008 (JP) ................................. 2008-132466
Jun. 26, 2008 (JP) ................................. 2008-167304

(51) Int. Cl.
*H04N 9/68* (2006.01)
*H04N 3/14* (2006.01)
*H04N 5/335* (2011.01)

(52) U.S. Cl. ......... 348/237; 348/272; 348/277; 348/308

(58) Field of Classification Search .................. 348/237, 348/266, 272, 276, 277, 279
See application file for complete search history.

(56) References Cited

U.S. PATENT DOCUMENTS

| 2008/0211943 A1* | 9/2008 | Egawa et al. ................. 348/294 |
| 2009/0213256 A1* | 8/2009 | Kudoh ........................... 348/302 |
| 2011/0032395 A1* | 2/2011 | Kido et al. .................... 348/272 |

* cited by examiner

*Primary Examiner* — Jordan Schwartz
(74) *Attorney, Agent, or Firm* — Robert D. Marshall, Jr.; W. James Brady; Frederick J. Telecky, Jr.

(57) ABSTRACT

This invention is a solid-state image pickup device that solves the problem of limited dynamic range in the high luminance region in an image sensor having white pixels. White pixels or yellow pixels and at least red pixels, green pixels or blue pixels are arranged in array form on the light receiving surface of a semiconductor substrate. White pixels or yellow pixels have an additional capacitance $C_S$ connected to the photodiode via the floating diffusion, a capacitance coupling transistor S that can couple or separate the floating diffusion and the additional capacitance. The proportion of white or yellow pixels to the total number of pixels is higher in a central portion of the light receiving surface than a peripheral portion. The white or yellow pixel may share a floating diffusion with a red, green or blue pixel.

10 Claims, 28 Drawing Sheets

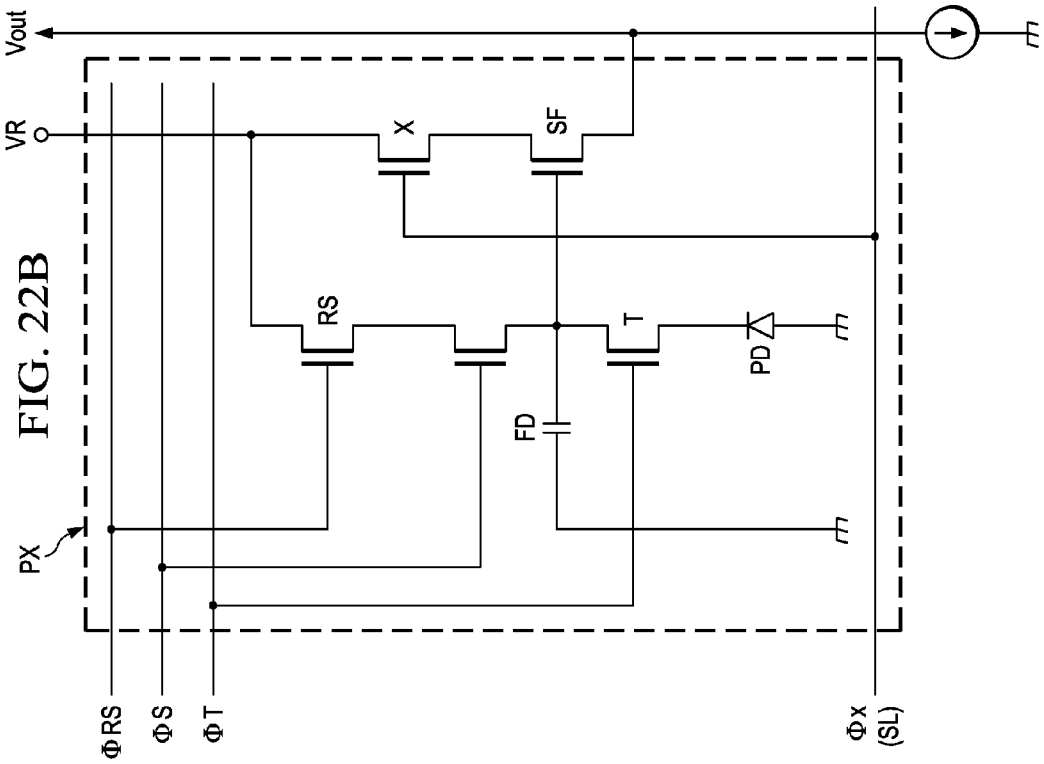
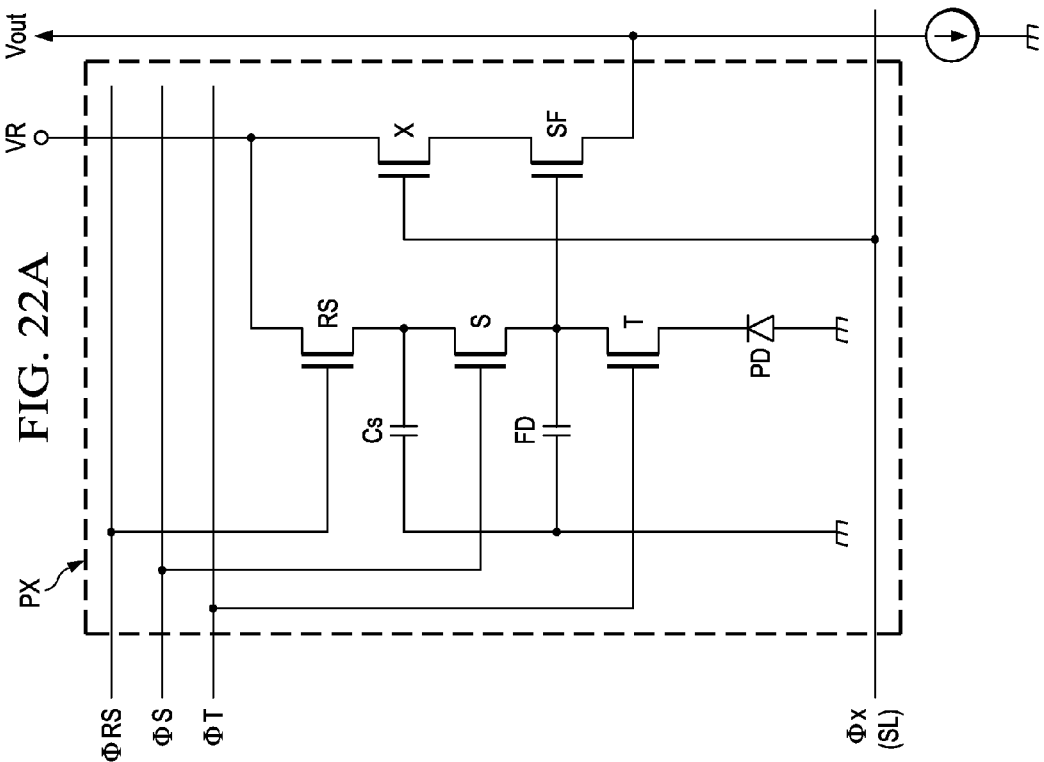

FIG. 27A
| R | Ye |
|---|----|
| G | B  |
FIG. 27B
| R  | G |
|----|---|
| Ye | B |
FIG. 27C
| G  | Ye |
|----|----|
| Ye | B  |
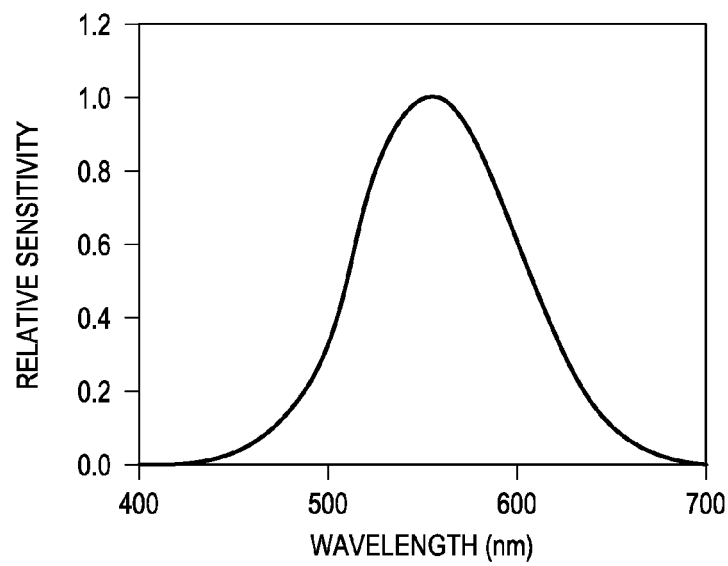
FIG. 28
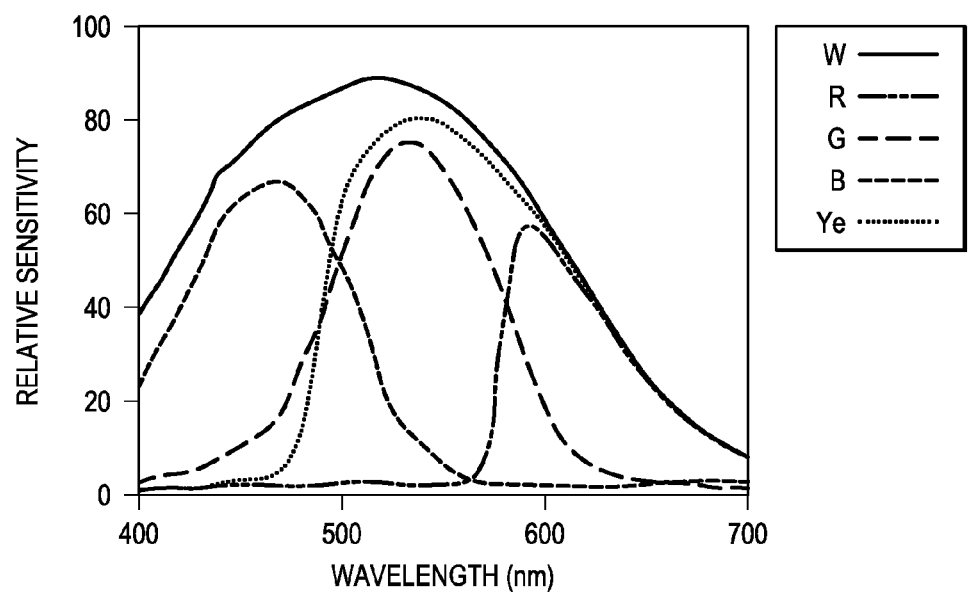
FIG. 29

SOLID-STATE IMAGE PICKUP DEVICE

CLAIM OF PRIORITY

This application claims priority under 35 U.S.C. 119(a) to Japanese Patent Application No. 2008-167304 filed Jun. 26, 2008.

TECHNICAL FIELD OF THE INVENTION

The technical field of this invention is a solid-state pickup device and particularly a CMOS type or CCD type solid-state image pickup device.

BACKGROUND OF THE INVENTION

The characteristics of a CMOS (complementary metal-oxide-semiconductor) image sensor or a CCD (charge coupled device) image sensor and other image input image sensors have been improved. The demand for these image sensors is growing in various application fields such as digital cameras or camera-incorporated cellular phones.

FIG. 33 shows the spectral sensitivity of an image sensor when using an IR ray eliminating filter rays and using various color filters on the silicon photodiodes that constitutes pixels of the image sensor in terms of light detection levels versus wavelength in Angstroms. The line marked R represents the spectral sensitivity of red pixels having a red filter. The line marked G represents the spectral sensitivity of green pixels having a green filter. The line marked B represents the spectral sensitivity of blue pixels having a blue filter. The line marked W represents the spectral sensitivity if there is no color filter. FIG. 33 illustrates that the spectral characteristics of the three primary colors represented by red, green and blue can be realized by transmitting through red, green and blue color filters.

When using color filters of different colors for each pixel in a single-plate color image sensor the quantum efficiency drops due to attenuation. This attenuation is determined by the spectral characteristics of the light source, the photodiode and the color filter. An attenuation of one half to one third may occur for green pixels.

The pixels in an image sensor usually have red, green and blue color filters. An image sensor may have white (W) pixels having no color filter added to improve sensitivity.

FIG. 34 is an output characteristic illustrating the logarithm of the number of signal charges (ordinate) with respect to the logarithm of luminance (abscissa) for pixels of the various colors. The R G, B and W lines have the same meaning as in FIG. 33. The output characteristics for the pixels of red, green, blue and white become straight lines with the same slope. The number of signal charges is saturated at a certain value.

White pixels with a large number of signal charges in the low luminance region can help improve the sensitivity. Since the white pixels are saturated at lower luminance than the red, green and blue pixels with low quantum efficiency in the high luminance region, the dynamic range in the high luminance region is limited.

In an image sensor having such white pixels, the dynamic range DR of the brightness information is from the floor noise level FN to the saturation level of the white pixels. FIG. 34 illustrates this dynamic range as 80 dB.

It is also possible to form an image using only RGB pixels without using white pixels. However, the resolution is poor since each pixel has less information.

As described above, in a conventional image sensor having white pixels, the white pixels can effectively improve the sensitivity in the low luminance region. However, since the white pixels are saturated at a lower luminance than the R, G and B pixels in the high luminance region, the dynamic range is limited.

Solid-state image sensors having pixels of using red, green and blue color filters having a wide dynamic range while maintaining high sensitivity and a high S/N ratio are disclosed in: Japanese Kokai Patent Application No. 2005-328493; International Patent Publication No. 2005/083790; and Japanese Kokai Patent Application No. 2006-217410.

The problem of this invention is the limitation upon the dynamic range in the high luminance region in an image sensor having white pixels.

SUMMARY OF THE INVENTION

This invention is a solid-state image pickup device having white pixels with no color filter or yellow pixels with a yellow color filter, and red pixels, green pixels and blue pixels with respective red, green and blue color filters arranged in array form on the light receiving surface of a semiconductor substrate. The white pixels or yellow pixels have a photodiode that receiving light and generating and accumulating photocharges, a transfer transistor transferring photocharges from the photodiode, a floating diffusion receiving photocharges transferred through the transfer transistor, an additional capacitance connected to the photodiode via the floating diffusion and to accumulate the photocharges transferred from the photodiode through the transfer transistor, a capacitance-coupling transistor selectively couples or separates the floating diffusion and the additional capacitance and a reset transistor connected to the additional capacitance or floating diffusion and used to discharge the photocharges in the additional capacitance and/or floating diffusion.

Preferably, in the solid-state image pickup device of the present invention, the white pixels or yellow pixels, red pixels, green pixels and blue pixels are integrated in array form on the semiconductor substrate.

Preferably, in the solid-state image pickup device of the present invention, the red pixels, green pixels and blue pixels have a photodiode that receives light and generates and accumulates photocharges, a transfer transistor transferring photocharges from the photodiode, a floating diffusion receiving the transferred photocharges through the transfer transistor, an additional capacitance connected to the photodiode via the floating diffusion and for accumulating the photocharges transferred from the photodiode through the transfer transistor, a capacitance-coupling transistor selectively coupling or separating the floating diffusion and the additional capacitance and a reset transistor connected to the additional capacitance or floating diffusion and to discharge the photocharges in the additional capacitance and/or the floating diffusion.

In the preferred embodiment, the additional capacitance of the white pixels or yellow pixels is larger than that of the red pixels, green pixels and blue pixels.

Preferably, in the solid-state image pickup device of the present invention, the red pixels, green pixels and blue pixels have a photodiode that receiving light and generating and accumulating photocharges, a transfer transistor transferring photocharges from the photodiode, a floating diffusion receiving the transferred photocharges through the transfer transistor and a reset transistor connected to the floating diffusion and to discharge the photocharges in the floating diffusion.

In the preferred embodiment, the floating diffusion is shared between the white pixels or yellow pixels and the red pixels, green pixels or blue pixels.

In the preferred embodiment of the solid-state image pickup device of the present invention, the total number of the white pixels or yellow pixels is smaller than the total number of the red pixels, green pixels or blue pixels.

Alternatively, the total number of the white pixels or yellow pixels is equal to or greater than the total number of the red pixels, green pixels or blue pixels.

In the preferred embodiment, the light receiving surface is divided into a central area and a peripheral area. The proportion of the white pixels or yellow pixels relative to all pixels in the peripheral area is higher than the proportion of the white pixels or yellow pixels relative to all pixels in the central area.

The solid-state image pickup device of the present invention includes an additional capacitance capacitance-separated from floating diffusion in white pixels. This expands the dynamic range solving the problem of limited dynamic range in the high luminance region.

BRIEF DESCRIPTION OF THE DRAWINGS

These and other aspects of this invention are illustrated in the drawings, in which:

FIGS. 22A and 22B are equivalent circuit diagrams of one pixel (pixel) in the CMOS image sensor in the fifth embodiment of the present invention;

FIGS. 26A and 26B are layout diagrams of the CMOS image sensor in a sixth embodiment of the present invention;

FIGS. 27A to 27C are layout diagrams of the CMOS image sensor in a seventh embodiment of the present invention;

FIG. 28 shows the visual sensitivity versus wavelength characteristic of a human;

FIG. 29 shows the spectral sensitivities of white pixels, red pixels, green pixels, blue pixels and yellow pixels versus wavelength in the seventh embodiment of the present invention;

DETAILED DESCRIPTION OF PREFERRED EMBODIMENTS

In the Figures reference number: 10 is an n-type semiconductor substrate; 11 is a p-type well; 12 is a p$^+$-type isolation region; 13 is an isolation insulating film; 14 is an n-type semiconductor region; 15 is a p$^+$-type semiconductor region; 16 and 17 are an n$^+$-type semiconductor region; 18 is a gate insulating film; 19 and 20 are a gate electrode; 21 is an insulating film; 22 is a plug; 23 is an upper layer wiring; 30 is a first electrode; 31 is a capacitance insulating film; 32 is a second electrode; R is a red pixel; G is a green pixel; B is a blue pixel; W is a white pixel; Ye is a yellow pixel; AM is an analog memory $C_{FD}$ and $C_{PD}$ are capacitances; $C_S$ and $C_{Sa}$ are additional capacitances; $N_1$ is a signal with reset level of $C_{FD}$ (noise); $N_2$ is a signal with reset level of $C_{FD}+C_S$ (noise); OUT is an output (line); PD is a photodiode; PX and PX1 to PX4 are pixels; Q, $Q_A$ and $Q_B$ are photocharges; S1 represents a pre-saturation charge signal; $S_1'$ is a modulated pre-saturation charge signal; $S_2$ is an over-saturation charge signal; $S_2'$ is a modulated over-saturation charge signal; SL is a selection line; SR$^H$ is a column shift register; SR$^V$ is a row shift register; $T_1$ to $T_8$ are various times; T is a transfer transistor; S is a capacitance coupling transistor; RS is a reset transistor; SF is an amplification transistor; X is a selection transistor; VR is a power supply voltage; φT, φS, φRS, φX, φS1+N1, φN1, φS1'+S2'+N2, φN2, φXCLR are drive signals; FN is follower noise; DR is dynamic range; ST1 to ST7 are method steps; AR1 is a central area; and AR2 is a peripheral area.

First Embodiment

The solid-state image pickup device disclosed in this embodiment is a CMOS image sensor. White pixels having no color filter, and red pixels, green pixels and blue pixels having corresponding red, green, and blue color filters are integrated in an array on the light receiving surface of a semiconductor substrate.

In the CMOS image sensor disclosed in this embodiment, the white pixels, red pixels, green pixels and blue pixels have a common circuit configuration and differ from each other in presence/absence and colors of corresponding color filters.

Figure 1:
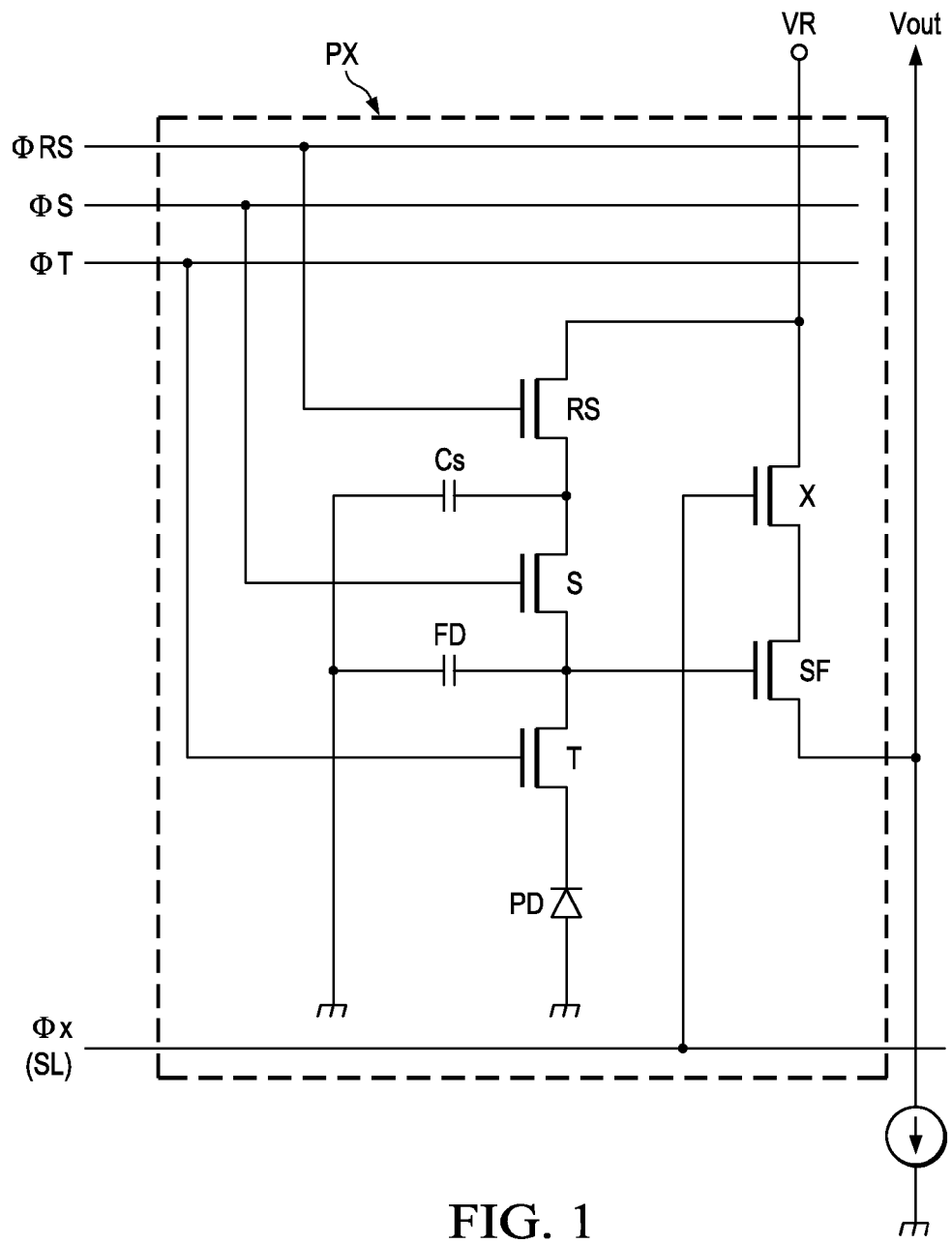
FIG. 1 is an equivalent circuit diagram of one pixel (pixel) in the CMOS image sensor disclosed in the first embodiment of the present invention.

FIG. 1 is an equivalent circuit diagram of one pixel (pixel) PX.

Each pixel includes: photodiode PD that receives light to generate and accumulate photocharges; transfer transistor T that transfers the photocharges from photodiode PD; floating diffusion FD which receives the transferred photocharges via transfer transistor T; additional capacitance $C_S$; capacitance-coupling transistor S that selectively couples or separates floating diffusion FD and the additional capacitance elements; reset transistor RS connected to floating diffusion FD via capacitance-coupling transistor S and used to discharge the photocharges in load capacitance $C_S$ and floating diffusion FD; amplification transistor (source follower) SF having its gate electrode connected to floating diffusion FD which amplifies and converts the photocharges in floating diffusion FD into a voltage signal; and selection transistor X connected in series with amplification transistor SF and used to select the pixel. The image sensor is a so-called 5-transistor CMOS image sensor. FIG. 1 illustrates the five transistors as all n-channel MOS transistors.

The CMOS image sensor of this embodiment has plural pixels with the configuration illustrated in FIG. 1 integrated in array form. For each pixel drive signal φT is connected to the gate electrodes of transfer transistor T, drive signal φS is connected to the gate electrode of capacitance-coupling transistor S, and drive signal φRS is connected to the gate electrode of reset transistor RS. Pixel selection line SL (φX) is driven by a line shift register connected to the gate electrode of selection transistor X. Power supply voltage VR is applied to the source/drain path of reset transistor RS and selection transistor X. Output line Vout is connected to the source/drain on the output side of amplification transistor SF. Output line Vout is controlled by a column shift register to output a voltage signal.

Selection transistor X and drive signal φX can be omitted. The voltage of floating diffusion FD can be fixed at an appropriate level so that the pixel can be selected or not selected. Selection transistor X may be connected between amplification transistor SF and output line Vout.

Figure 2:
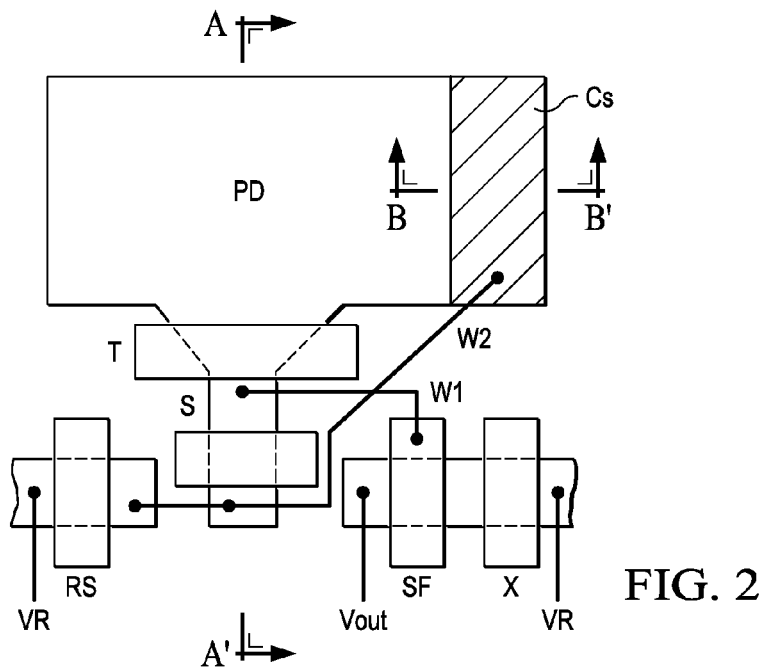
FIG. 2 is an example of the layout diagram of one pixel (1 pixel) in the CMOS image sensor disclosed in the first embodiment of the present invention.

FIG. 2 is an example of the layout diagram of one pixel in the CMOS image sensor of this embodiment.

Photodiode PD, additional capacitance $C_S$ and five transistors including transfer transistor T, capacitance-coupling transistor S, reset transistor RS, amplification transistor source follower SF and selection transistor X are arranged as shown in FIG. 2. Floating diffusion FD between transfer transistor T and capacitance-coupling transistor S is connected to the gate of amplification transistor source follower SF by wire W1. Additional capacitance $C_S$ is connected by W2. Power supply voltage VR is connected to one of the diffused layers of reset transistor RS and selection transistor X. This construction realizes a circuit equivalent to the circuit shown in FIG. 1. When the layout shown in FIG. 2 is repeated, power supply voltage VR is connected to the diffused layer between reset transistor RS of one pixel and selection transistor X of another pixel.

In this layout, the channel of transfer transistor T is wider on the side of photodiode PD but narrower on the side of floating diffusion FD. Thus photocharges can be transferred from photodiode PD to floating diffusion FD without delay. On the other hand, since the channel is narrower on the side of floating diffusion FD, the capacitance of floating diffusion FD is reduced. This also increases the variation range of the potential with respect to the charges accumulated in floating diffusion FD.

In the CMOS image sensor of this embodiment, capacitance $C_{FD}$ of floating diffusion FD is not especially limited. For example, it may be less than the capacitance $C_{PD}$ of photodiode PD.

Figure 3A:
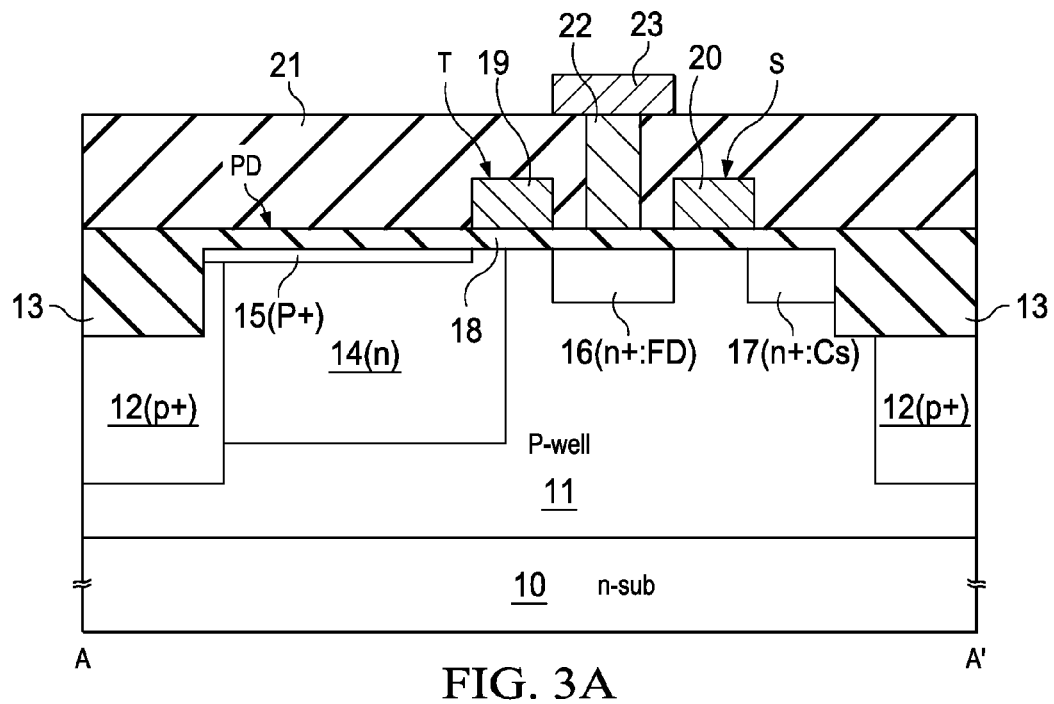
FIG. 3A is a schematic cross-sectional view along line A-A' in FIG. 2 illustrating a part of the CMOS image sensor of a first embodiment of the present invention.

FIG. 3A is a schematic cross-sectional view illustrating a part of each pixel in the CMOS image sensor including the diffused layer that constitutes photodiode PD, transfer transistor T, floating diffusion FD, capacitance-coupling transistor S, and additional capacitance $C_S$ of this embodiment. This is the cross-sectional view along line A-A' in FIG. 2.

P-type well (p-well) 11 is formed on n-type silicon semiconductor substrate (n-sub) 10. The region of each pixel and additional capacitance $C_S$ is bounded by p$^+$-type isolation region 12 and element isolation insulating film 13 formed by STI (shallow trench isolation) or a like method.

N-type semiconductor region 14 is formed in p-type well 11. P$^+$-type semiconductor region 15 is formed in its surface layer. The PN junction constitutes a charge transfer buried type photodiode PD.

A region is formed to stick out from p+-type semiconductor region 15 at the end of n-type semiconductor region 14. N+-type semiconductor region 16 acting as floating diffusion FD is formed in the surface layer of p-type well 11 at a prescribed distance from the region. N+-type semiconductor region 17 constituting additional capacitance $C_S$ is formed in the surface layer of p-type well 11 at a prescribed distance from the region.

A gate electrode 19 made of polysilicon is formed via gate insulating film 18 made of silicon oxide on the top of p-type well 11 in the area of n-type semiconductor region 14 and n+-type semiconductor region 16. Transfer transistor T has a channel formation region in the surface layer of p-type well 11 with n-type semiconductor region 14 and n+-type semiconductor region 16 acting as source/drain.

A gate electrode 20 made of polysilicon is formed via gate insulating film 18 made of silicon oxide on the top of p-type well 11 in the area of n+-type semiconductor region 16 and n+-type semiconductor region 17. Capacitance-coupling transistor S has a channel formation region in the surface layer of p-type well 11 formed with n+-type semiconductor region 16 and n+-type semiconductor region 17 acting as source/drain.

Insulating film 21 made of silicon oxide covers photodiode PD, transfer transistor T and capacitance-coupling transistor S. An opening is formed that reaches n+-type semiconductor region 16. Plug 22 is buried in it, and upper layer wiring 23 is formed on the top of plug 22. Upper layer wiring 23 is connected to the gate electrode (not shown in FIG. 3) of amplification transistor SF in a region not shown in FIG. 3.

An opening part that reaches n+-semiconductor region 17 is formed in a region not shown in FIG. 3. Wiring connects n+-semiconductor region 17 to additional capacitance $C_S$ in a manner described later.

Drive signal φT connects to the gate electrode 19 of transfer transistor T. Drive signal φS connects to gate electrode 20 of capacitance-coupling transistor S.

Reset transistor RS, amplification transistor SF, selection transistor X, various drive signals (φT, φS, φRS, φX) and output line Vout are disposed in a region not shown in FIG. 3 on semiconductor substrate 10 shown in FIG. 3(A) to form the circuit of FIG. 1.

Figure 3B:
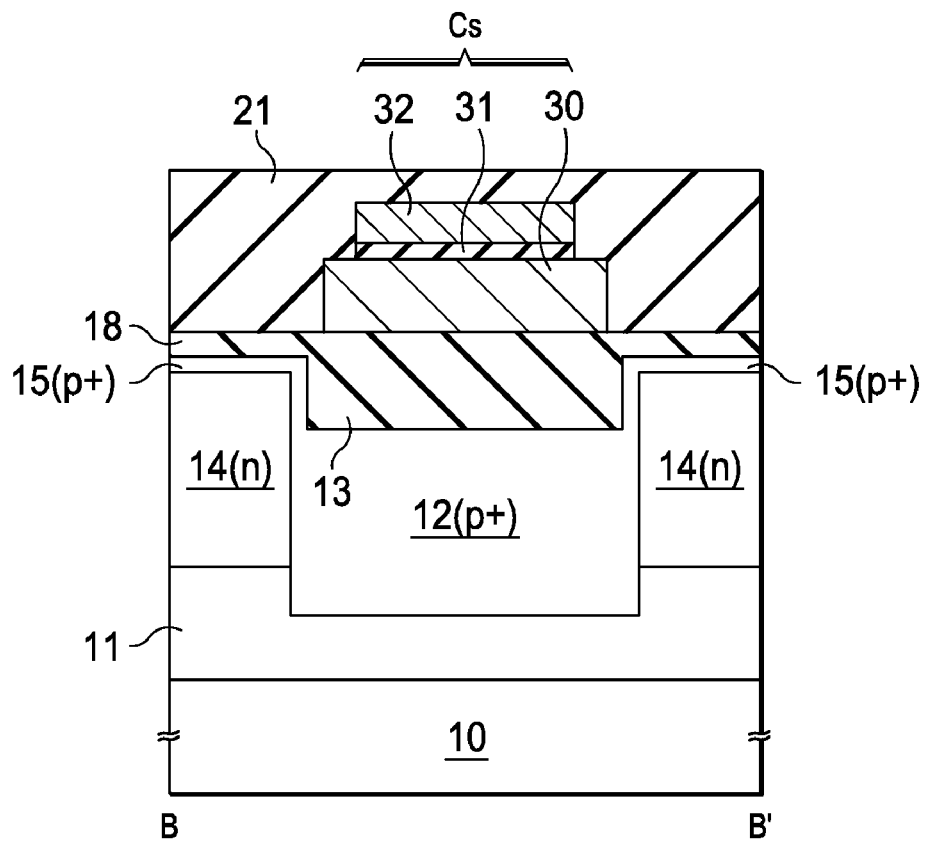
FIG. 3B is a schematic cross-sectional view along line B-B' in FIG. 2.

FIG. 3B is a schematic cross-sectional view along line B-B' in FIG. 2 illustrating photodiode PD, additional capacitance $C_S$, and photodiode PD of the adjacent pixel of each pixel in the CMOS image sensor of this embodiment.

The region between photodiode PD having n-type semiconductor region 14 and p+-type semiconductor region 15 formed in p-type well 11 and photodiode PD having n-type semiconductor region 14 and p+-type semiconductor region 15 in the adjacent pixel becomes an element isolation region. P+-type isolation region 12 and STI type element isolation insulating film 13 are formed in this region.

A first electrode 30 made of polysilicon, insulating film 31, and a second electrode 32 made of polysilicon are laminated on element isolation insulating film 13 to form additional capacitance $C_S$.

Insulating film 21 covers the additional capacitance $C_S$. The wiring connected to the n+-type semiconductor region 17 connects to the first electrode 30 or the second electrode 32 via a contact or the like.

The capacitance of an impurity diffused layer in the semiconductor substrate may form the additional capacitance instead of the pair of electrodes 30 and 32 that sandwich insulating film 13 shown in FIG. 3B.

Figure 4A:
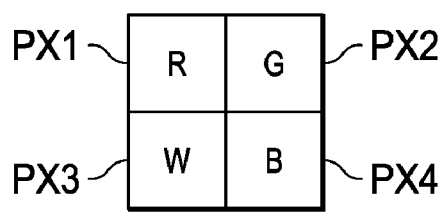
FIG. 4A is a layout diagram of four pixels arranged in 2 rows by 2 columns in the CMOS image sensor of the first embodiment of the present invention.

FIG. 4A is a layout diagram of four pixels arranged as 2 rows by 2 columns in the CMOS image sensor of this embodiment.

In this embodiment the number of white pixels W is smaller than the total number of red pixels R, green pixels G and blue pixels B. More specifically, the ratio of the number of white pixels to the total number of red pixels R, green pixels G and blue pixels is 1:3.

Four pixels (PX1 to PX4) including a white pixel W, a red pixel R, a green pixel G and a blue pixel B are taken as one group. This group of pixels configured as shown in FIG. 4A repeats in the row direction and the column direction on the light receiving surface.

White pixel W and green pixel G are disposed diagonally. Red pixel R and blue pixel B are also disposed diagonally.

Figure 4B:
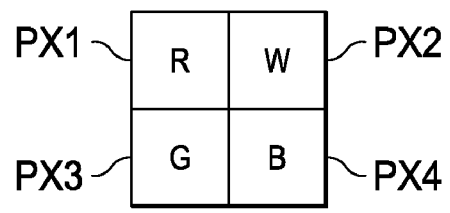
FIG. 4B shows a modification of the example of FIG. 4(A)

FIG. 4B shows a modification of the example of FIG. 4A. White pixel W and green pixel G are switched relative to the layout shown in FIG. 4A.

Figure 5:
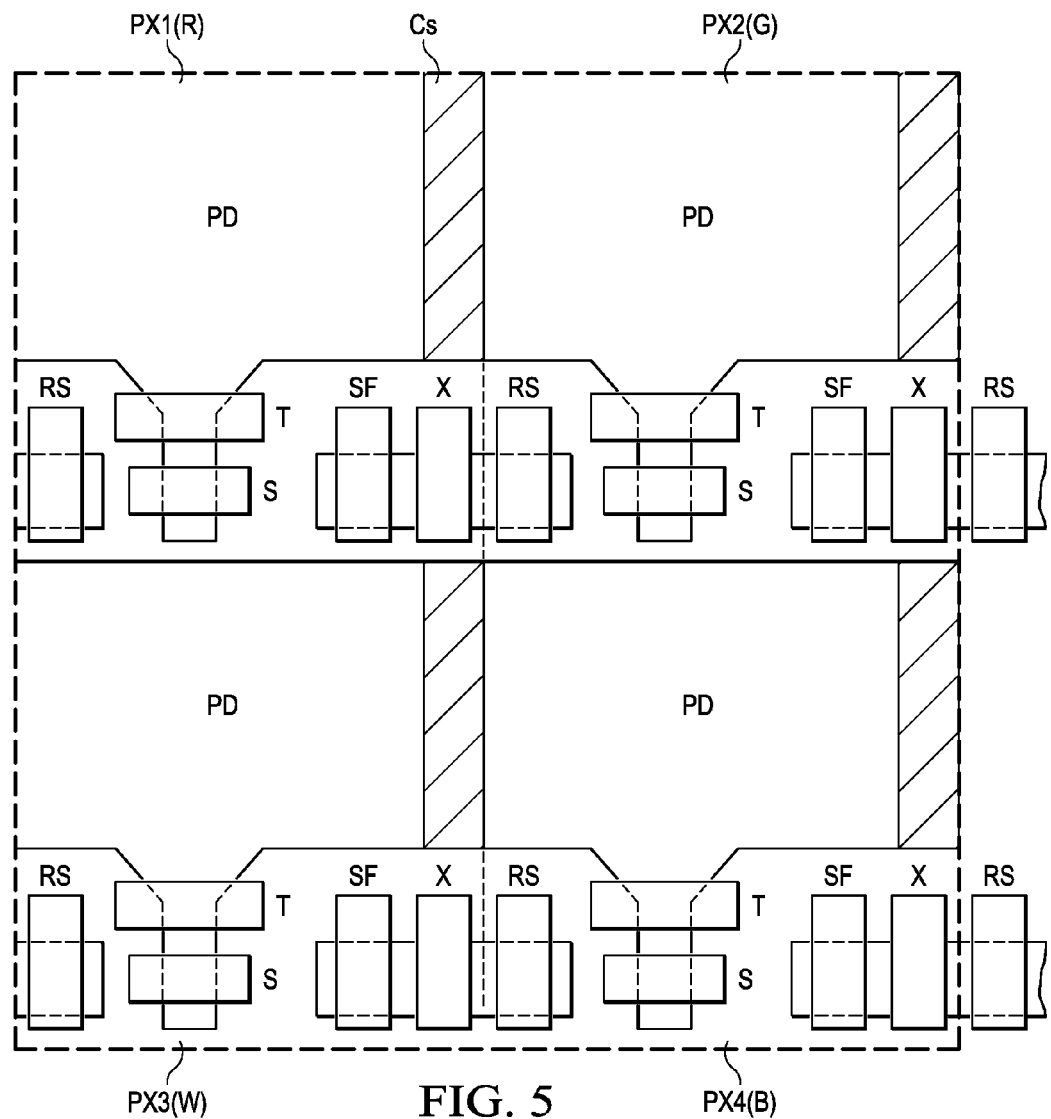
FIG. 5 is a layout diagram illustrating the state in which the layout shown in FIG. 2 is applied to a group of four pixels in the layout shown in FIG. 4(A)

FIG. 5 is a layout diagram illustrating the layout shown in FIG. 2 as applied to the group of four pixels shown in FIG. 4A.

Each of four pixels (PX1 to PX4) has photodiode PD, additional capacitance element $C_S$, transfer transistor T, capacitance-coupling transistor S, reset transistor RS, amplification transistor source follower SF and selection transistor X. A power supply voltage VR line connected to reset transistor RS and selection transistor X is shared between pixels in adjacent rows.

The circuit configuration of the entire CMOS image sensor where pixels with the aforementioned configuration are integrated in array form is explained below.

Figure 6A:
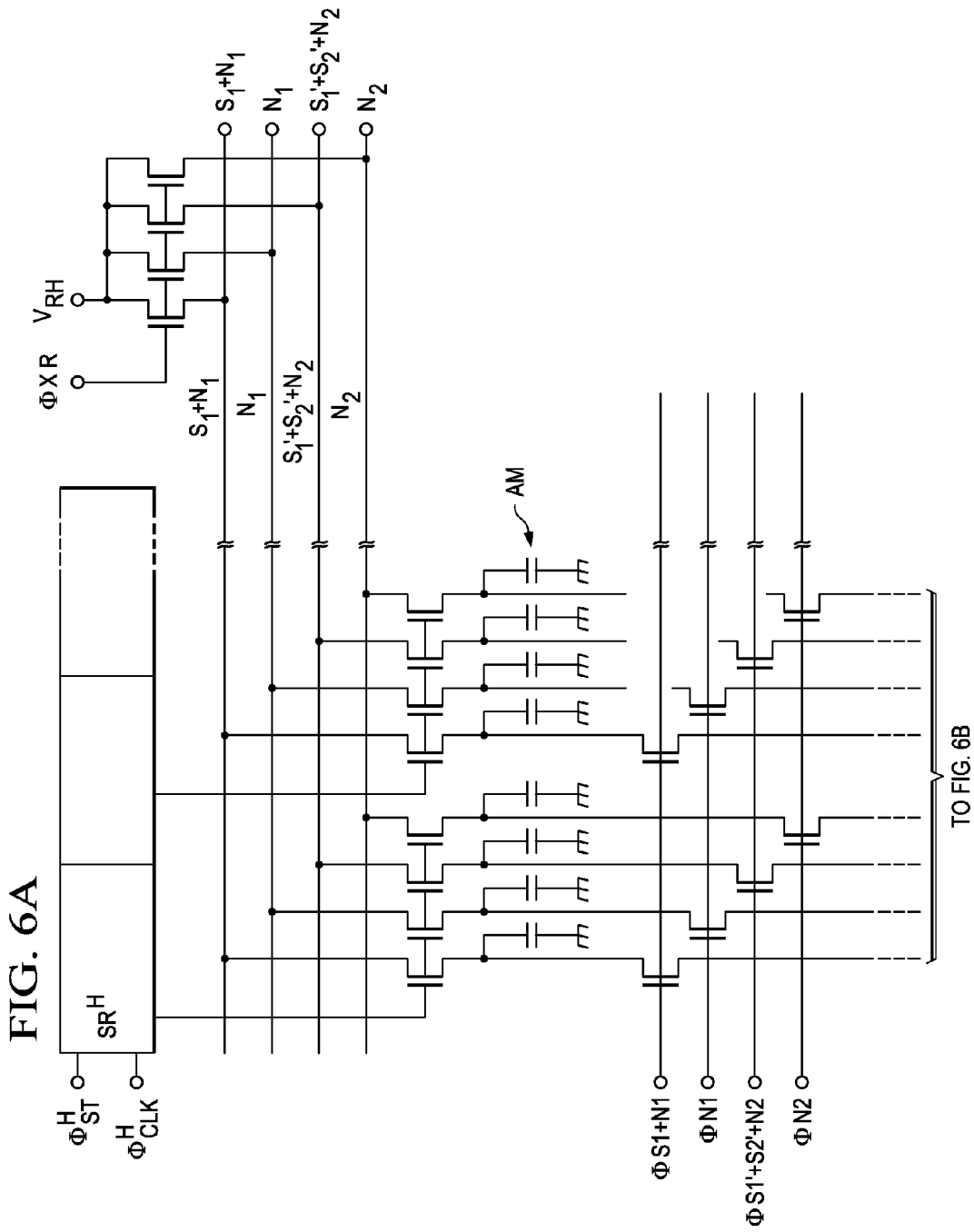
FIGS. 6A and 6B are an equivalent circuit diagram illustrating the entire circuit configuration of the CMOS image sensor of the first embodiment of the present invention.
Figure 6B:
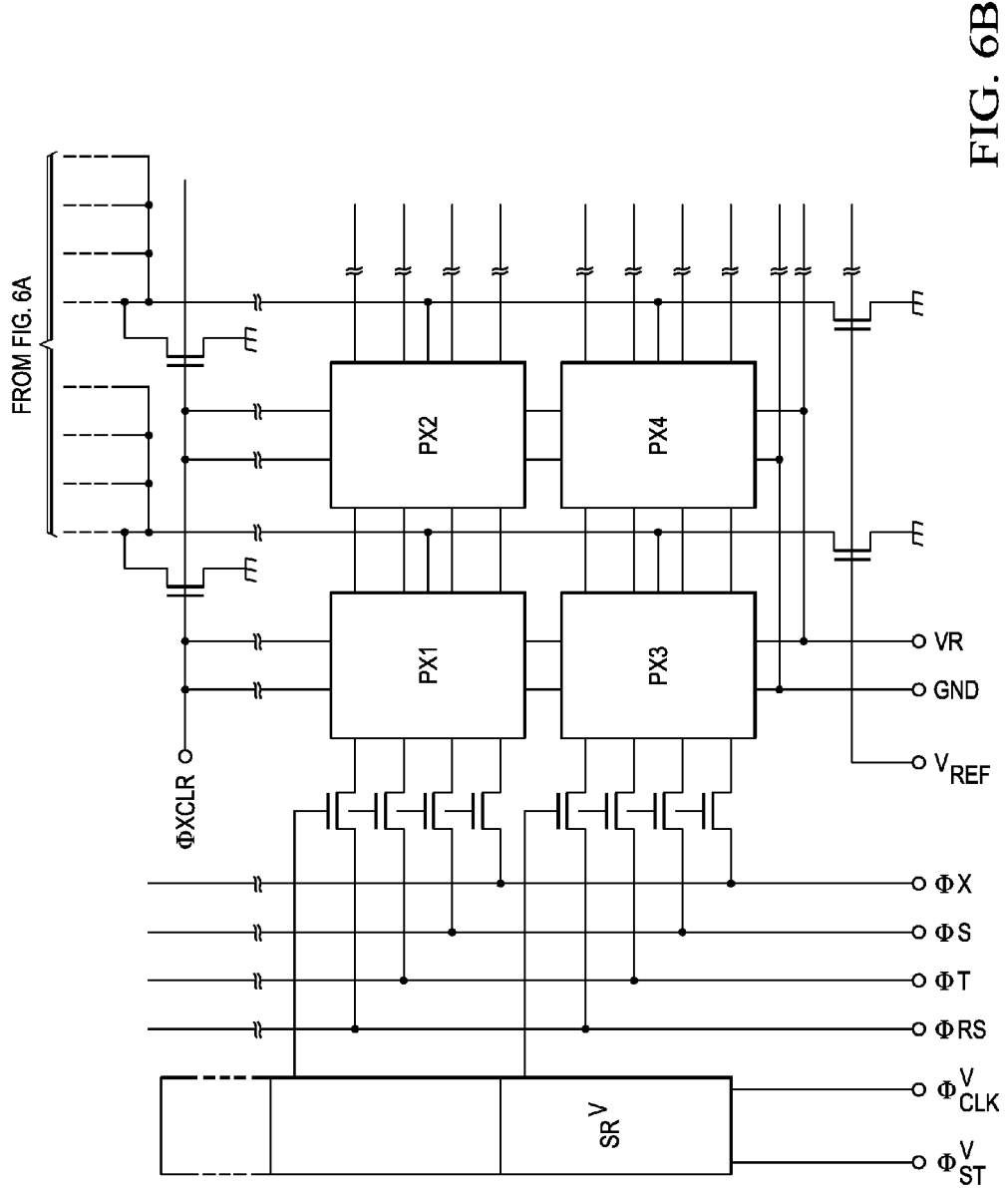

FIGS. 6A and 6B are a circuit diagram illustrating the circuit configuration of the entire CMOS image sensor of this embodiment.

Plural pixels are arranged in array form on the light receiving surface. FIGS. 6A and 6B show the group of four pixels (PX1 to PX4) shown in FIGS. 4A and 5. A pixel group with this configuration repeats in the row direction and the column direction.

Drive signals φT, φS and φRS controlled at line shift register $SR^V$, power voltage VR and ground GND are connected to each pixel PX.

Each pixel is controlled by column shift register $SR^H$ and drive signals φS1+N1, φN1, φS1'+S2'+N2 and φN2. As later be described, pre-saturation charge signal plus $C_{FD}$ noise ($S_1$+$N_1$), $C_{FD}$ noise ($N_1$), modulated pre-saturation charge signal plus modulated over-saturation charge signal $C_{FD}$ plus $C_S$ noise ($S_1$'+$S_2$'+$N_2$), and $C_{FD}$+$C_S$ noise ($N_2$) are output at respective timings from each pixel via analog memory AM. Analog memory AM can be cleared by drive signal φXCLR.

Figure 7:
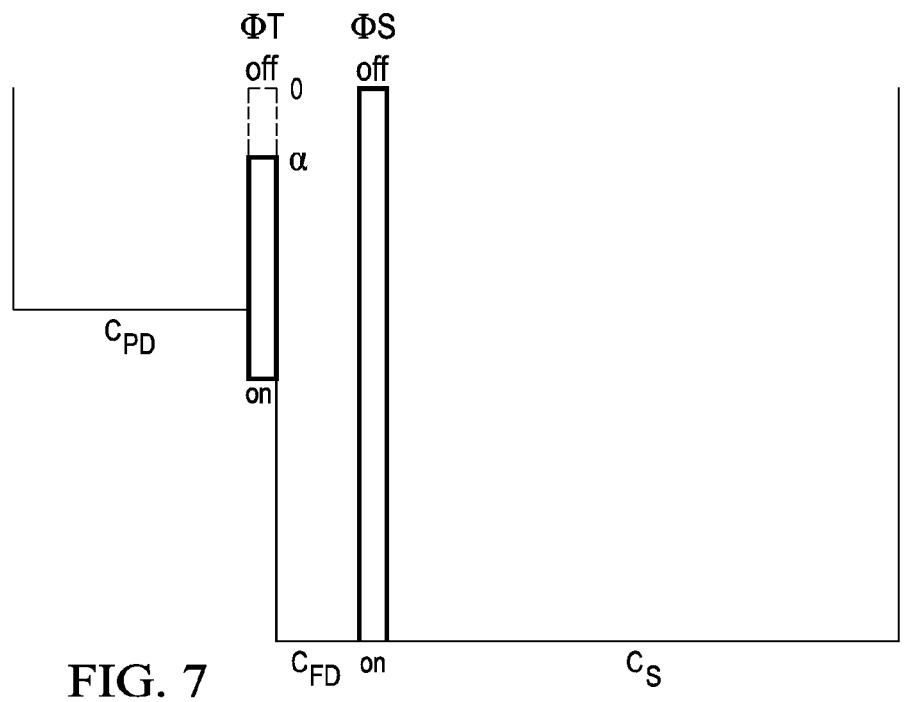
FIG. 7 is a schematic potential diagram equivalent to the photodiode, the transfer transistor, the floating diffusion, the capacitance-coupling transistor, and the additional capacitance in the CMOS image sensor of the first embodiment of the present invention.

FIG. 7 is a schematic potential diagram equivalent to photodiode PD, transfer transistor T, floating diffusion FD, capacitance-coupling transistor S and additional capacitance $C_S$ in a pixel with the aforementioned configuration.

Photodiode PD includes capacitance $C_{PD}$ with a relatively shallow potential. Floating diffusion FD and additional capacitance $C_S$ includes capacitance ($C_{FD}$, $C_S$) with relatively deep potential.

Transfer transistor T assumes one of two levels depending on the state of drive signal φT. Capacitance-coupling transistor S also assumes one of two levels depending on the state of drive signal φS.

The OFF potential for transfer transistor T is a voltage α1 with respect to the voltage applied to the semiconductor substrate considering the overflow from photodiode PD to floating diffusion FD. The OFF potential of the capacitance-coupling transistor S is α2 or 0 V. Alternatively, the voltages α1 and α2 can have the same potential.

This method of driving the CMOS image sensor of this embodiment is explained based on the equivalent circuit diagram of FIG. 1 and the potential diagram of FIG. 7.

Figure 8:
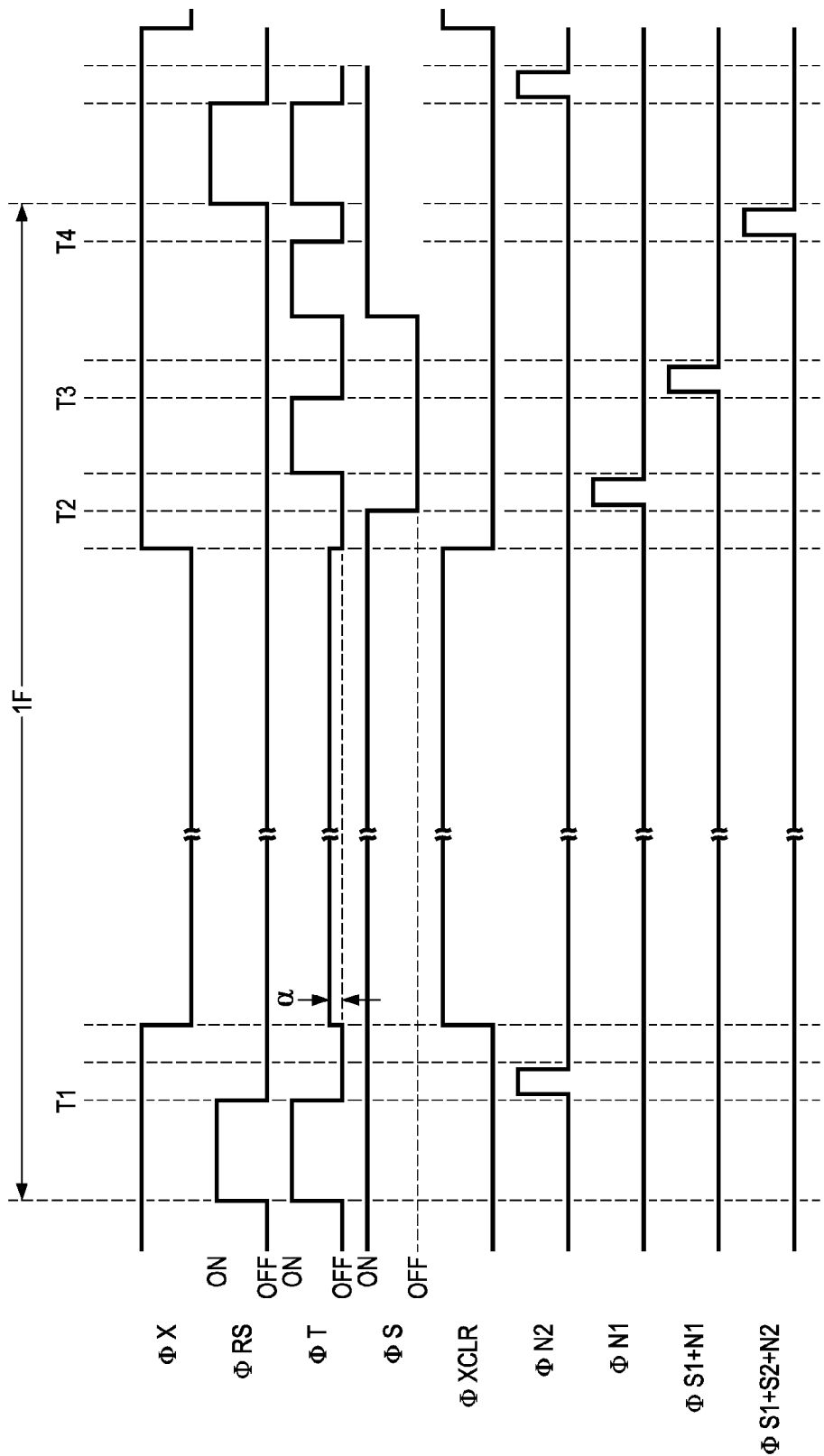
FIG. 8 is a timing chart that shows voltages applied on the two levels for on/off to driving lines in the CMOS image sensor corresponding to FIG. 4 in the first embodiment of the present invention.

FIG. 8 is a timing chart that shows the voltages applied to drive signals φX, φT, φS, φR, φXCLR at the two levels for ON/OFF and at three levels including the level +α for drive signal φT.

The voltage applied to drive signal φT may also have two levels ON and +α. When three levels are employed as in this example, this increases the maximum signal voltage for floating diffusion FD. When drive signal φT is driven at two levels, the OFF level in FIG. 7 can be used as the +α level.

FIGS. 9A to 9B and FIGS. 10A to 10C are equivalent potential diagrams at individual times of the timing chart illustrated in FIG. 8.

At the beginning of one field 1F, drive signals φT and φR are turned ON. Drive signals φX and φS are already in the ON state to discharge all photocharges generated in the previous field and reset. At time $T_1$, drive signals φT and φR are turned OFF. However, drive signal φT becomes +α shortly after. When drive signal φT becomes +α, drive signal φX is turned OFF and drive signal φXCLR is turned ON.

Figure 9A:
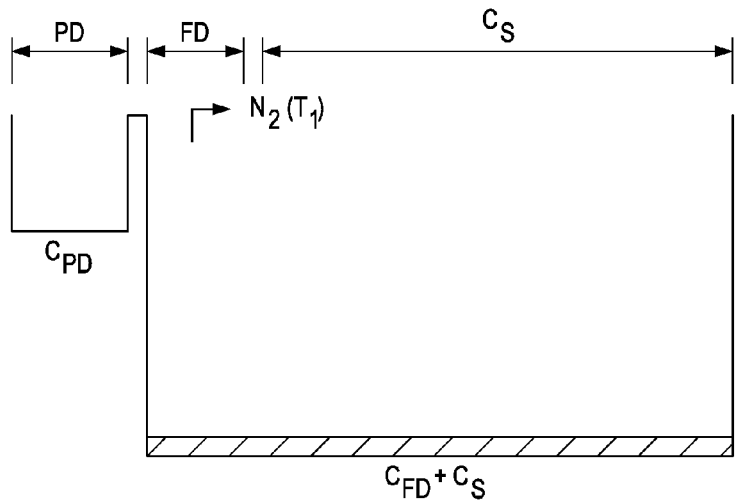
FIGS. 9A to 9C are schematic potential diagrams equivalent to the photodiode-additional capacitance in the CMOS image sensor of the first embodiment of the present invention.

At the time shown in FIG. 9A, because drive signal φS is ON, capacitances $C_{FD}$ and $C_S$ are coupled together. Immediately reset, so-called kTC noise occurs in capacitances $C_{FD}$ and $C_S$ due to the reset operation. At that time, drive signal φN2 is turned ON and the signal of the reset level of the connected capacitances $C_{FD}$ and $C_S$ is read out as noise $N_2$.

During an accumulation period controlled when drive signal φR changes to OFF at time $T_1$, photocharges accumulate in photodiode PD. When drive signal φT has level +α, the barrier between capacitances $C_{PD}$ and $C_{FD}$ lowers slightly.

When accumulation of charge begins, the photocharges accumulate in capacitance $C_{PD}$. When the photoelectrons reach a quantity that saturates $C_{PD}$ as illustrates in FIG. 9B while drive signal φT has the level +α, the photocharges exceed the slightly lowered barrier, overflow from capacitance $C_{PD}$ and selectively accumulate in the combined capacitances $C_{FD}$ and $C_S$ of that pixel.

If the quantity of photoelectrons does not saturate photodiode PD, the photocharges only accumulate in capacitance $C_{PD}$. If the quantity of photoelectrons saturates photodiode PD, photocharges will also accumulate in capacitances $C_{FD}$ and $C_S$ in addition to capacitance $C_{PD}$.

Figure 9B:
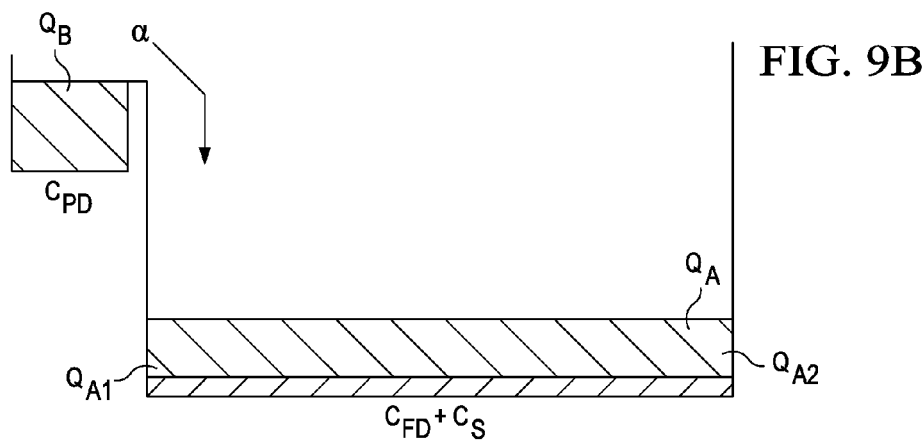

FIG. 9B shows the state in which capacitance $C_{PD}$ is saturated. Pre-saturation charge $Q_B$ has accumulated in capacitance $C_{PD}$ and over-saturation charge $Q_A$ has accumulated in capacitances $C_{FD}$ and $C_S$.

Figure 9C:
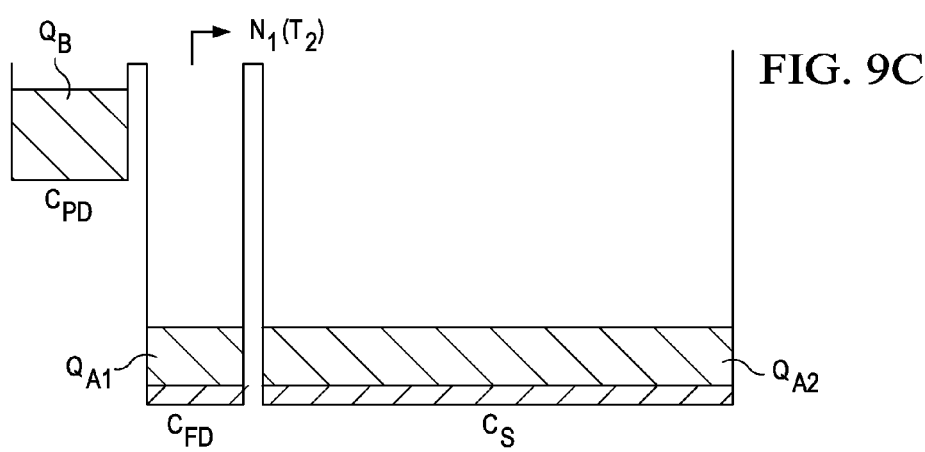

Next drive signal φT returns from level +α to OFF. At time $T_2$, drive signal φS is turned OFF. FIG. 9(C) shows the potentials of capacitances $C_{FD}$ and $C_S$ are divided. At the time drive signal φT is turned OFF, drive signal φX is turned ON and drive signal φXCLR is turned OFF. At that time over-saturation charge $Q_A$ is divided into charges $Q_{A1}$ and $Q_{A2}$ corresponding to the capacitance ratio between capacitances $C_{FD}$ and $C_S$. At that time, drive signal φN1 is turned ON and a signal with the level of $C_{FD}$ that holds a part of the over-saturation charge $Q_{A1}$ is read as noise $N_1$.

Figure 10A:
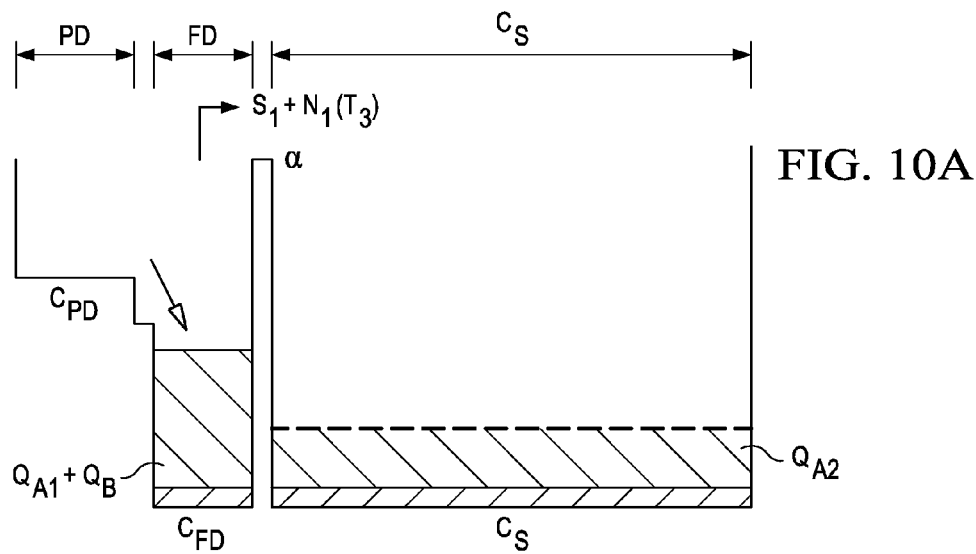
FIGS. 10A to 10C are schematic potential diagrams equivalent to the photodiode-additional capacitance in the CMOS image sensor of the first embodiment of the present invention.

Then, drive signal φT turns ON. As shown in FIG. 10A, pre-saturation charge $Q_B$ in capacitance $C_{PD}$ is transferred to capacitance $C_{FD}$ and is mixed with the part $Q_{A1}$ of the over-saturation charge held in capacitance $C_{FD}$.

At that time, since the potential of capacitance $C_{PD}$ is shallower than that of capacitance $C_{FD}$ and the level of the transfer transistor is deeper than that of capacitance $C_{PD}$, the total charge pre-saturation charge $Q_B$ in capacitance $C_{PD}$ is transferred to capacitance $C_{FD}$.

At time $T_3$, drive signal φT returns to OFF, drive signal φS1+N1 turns ON and pre-saturation charge signal $S_1$ is read out from the pre-saturation charge $Q_B$ transferred to capacitance $C_{FD}$. A charge equal to the sum of the pre-saturation charge $Q_B$ and part $Q_{A1}$ of the over-saturation resides in capacitance $C_{FD}$. The signal read becomes $S_1+N_1$. FIG. 10A shows the state before drive signal φT returns to OFF.

Figure 10B:
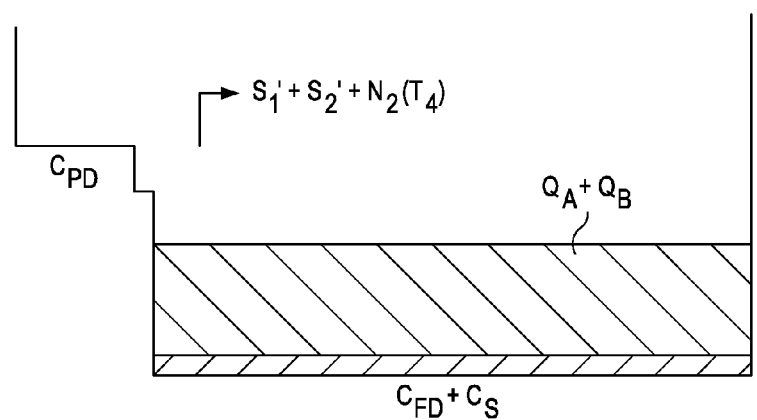

The potentials of capacitances $C_{FD}$ and $C_S$ are combined by turning on drive signals φS and φT. FIG. 10B shows a charge equal to the sum of pre-saturation charge $Q_B$ and part $Q_{A1}$ of the over-saturation charge mixed with part $Q_{A2}$ of the over-saturation charge in capacitance $C_S$. Since the sum of part $Q_{A1}$ of the over-saturation charge and part $Q_{A2}$ of the over-saturation charge is equal to over-saturation charge $Q_A$ prior to the division, a signal equal to the sum of pre-saturation charge $Q_B$ and over-saturation charge $Q_A$ is held in the combined potential of capacitances $C_{FD}$ and $C_S$.

At time $T_4$, drive signal φT returns to OFF and drive signal φS1'+S2'+N2 turns ON. The signal of the sum of pre-saturation charge signal $S_1$ and over-saturation charge signal $S_2$ is read out from the pre-saturation charge $Q_B$ plus over-saturation charge $Q_A$ shared in capacitances $C_{FD}$ and $C_S$. In this case, noise is present capacitances $C_{FD}$ and $C_S$. This is also read from the charge shared in capacitances $C_{FD}$ and $C_S$. The actual signal read in $S_1'+S_2'+N_2$; where $S_1'$ and $S_2'$ are values of $S_1$ and $S_2$ reduced depending on the capacitance ratio of capacitances $C_{FD}$ and $C_S$. FIG. 10B shows the state before drive signal φT returns to OFF.

Figure 10C:
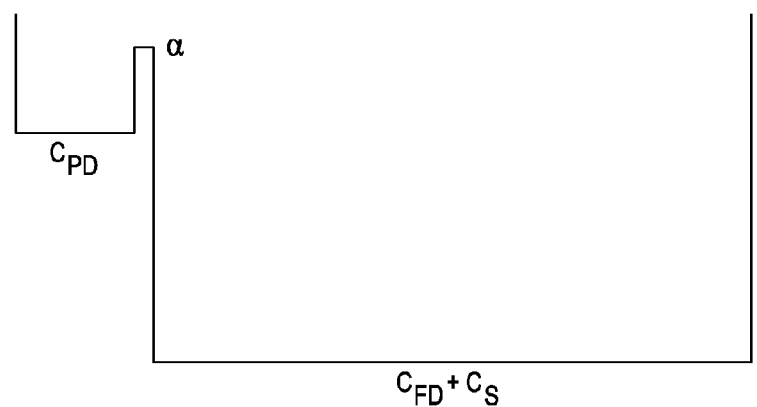

When the field 1F ends, the next field begins. With drive signal φS in the ON state, drive signals φT and φR are turned ON. As shown in FIG. 10C, all photocharges generated in the previous field are discharged and the image sensor is reset.

As described above, whether or not the photocharge Q accumulated in capacitance $C_{PD}$ exceeds or does not exceed that in capacitance $C_{FD}$, various signals of pre-saturation charge signal plus $C_{FD}$ noise ($S_1+N_1$), $C_{FD}$ noise ($N_1$), modulated pre-saturation charge signal plus modulated over-saturation charge signal plus $C_{FD}$ and $C_S$ noise ($S_1'+S_2'+N_2$), and $C_{FD}$ and $C_S$ noise ($N_2$) are read out. The output of the pixel corresponding pixel is obtained from these signal as described below.

Pre-saturation charge signal plus $C_{FD}$ noise ($S_1+N_1$) and $C_{FD}$ noise ($N_1$) supply respective differential amplifier inputs. $C_{FD}$ noise ($N_1$) is canceled out by forming the difference. The result is and pre-saturation charge signal $S_1$.

Modulated pre-saturation charge signal plus modulated over-saturation charge signal plus $C_{FD}$ and $C_S$ noise ($S_1'+S_2'+N_2$) and $C_{FD}$ and $C_S$ noise ($N_2$) supply respective differential amplifier inputs. $C_{FD}$ and $C_S$ noise $N_2$ is canceled out by forming the difference. The result depends on the capacitance ratio of capacitances $C_{FD}$ and $C_S$. The signal is then adjusted to the same gain as pre-saturation charge signal $S_1$ to obtain the sum $S_1+S_2$ of the pre-saturation charge signal and the over-saturation charge signal.

In the following, demodulation of the modulated pre-saturation charge signal ($S_1'$)+modulated over-saturation charge signal ($S_2'$) will be explained.

$S_1'$, $S_2'$, and α (charge allocation ratio of capacitances $C_{FD}$ to $C_{FD}+C_S$) are expressed as follows.

$$S_1' = S_1 \times \alpha \qquad (1)$$

$$S_2' = S_2 \times \alpha$$

-continued $$\alpha = \frac{C_{FD}}{C_{FD} + C_S}$$

Consequently, α is derived from the values of capacitances $C_{FD}$ and $C_S$. Substituting the value of α into the other equations permits calculation of $S_1+S_2$. This signal can be adjusted to the same gain as $S_1$ obtained separately. Either $S_1$ or $S_1+S_2$ obtained as described is selected and used as the pixel output.

If the first signal (pre-saturation charge signal $S_1$) is equal to or smaller than the saturation signal of floating diffusion capacitance $C_{FD}$, the first signal will be used as the output of the concerned pixel. If the pre-saturation charge signal $S_1$ exceeds the saturation signal of floating diffusion capacitance $C_{FD}$, the pre-saturation charge signal $S_1$ plus the over-saturation charge signal $S_2$ will be used as the output of the pixel.

A comparator compares the pre-saturation charge signal $S_1$ with a reference potential. Then either pre-saturation charge signal $S_1$ or the sum of pre-saturation charge signal $S_1$ and over-saturation charge signal $S_2$ is selected and output depending on the result.

The CMOS image sensor can separately output $S_1$ or $S_1+S_2$. Alternatively the CMOS image sensor can output the signals of pre-saturation charge signal plus $C_{FD}$ noise ($S_1+N_1$), $C_{FD}$ noise ($N_1$), modulated pre-saturation charge signal plus modulated over-saturation charge signal plus $C_{FD}$ and $C_S$ noise ($S_1'+S_2'+N_2$), and $C_{FD}+C_S$ noise ($N_2$). The differential amplifier and other circuits are external to the CMOS image sensor.

If capacitance $C_{FD}$ of floating diffusion FD is smaller than capacitance $C_{PD}$ of photodiode PD ($C_{FD}<C_{PD}$), then using only the signal of smaller capacitance $C_{FD}$ would achieve high sensitivity and a high S/N ratio for signals in the low luminance region from only the pre-saturation charge signal $S_1$. If the sum of capacitance $C_{FD}$ of floating diffusion FD and capacitance $C_S$ of the additional capacitance is equal to or larger than capacitance $C_{PD}$ of photodiode PD ($C_{FD}+C_S \geq C_{PD}$), then using the sum of pre-saturation charge signal $S_1$ and over-saturation charge signal $S_2$ would achieve high sensitivity not only in the low luminance region but also up to the high luminance region corresponding to the saturation amount of capacitance $C_{PD}$ of photodiode PD.

It is possible to further improve the sensitivity in the low luminance region by making capacitance $C_{FD}$ of floating diffusion FD smaller than capacitance $C_S$ of the additional capacitance ($C_{FD}<C_S$).

If $C_{FD}$ is set at 0.4 fF so that individual electrons can be detected, it is possible to obtain a high-sensitivity signal up to the region with $C_{PD}$ in the range of about 3-4 fF by setting the ratio $C_{FD}:C_S$ at 1:7.

Figure 11:
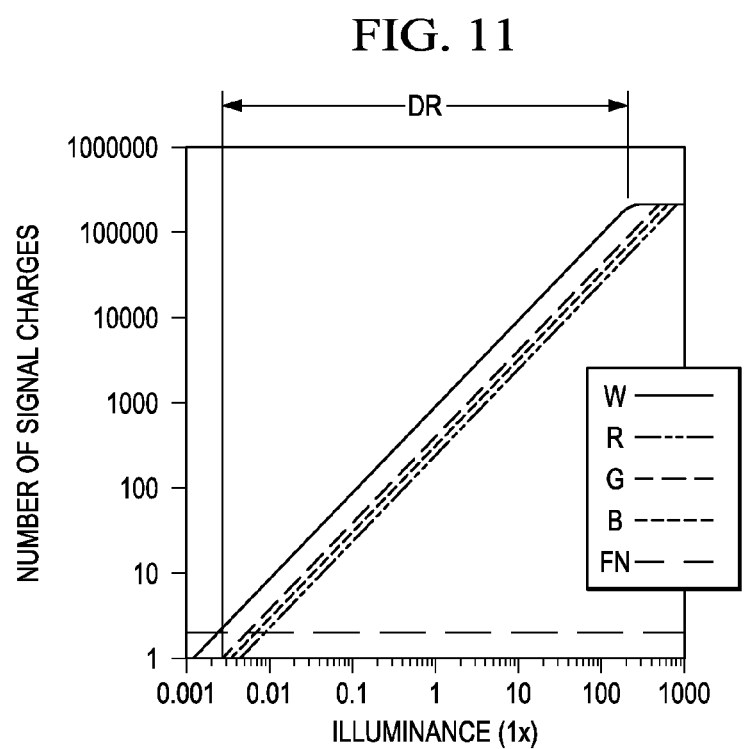
FIG. 11 shows an output characteristic illustrating the logarithm (ordinate) of the number of signal charges with respect to the logarithm (abscissa) of the luminance of the CMOS image sensor in the first embodiment of the present invention.

FIG. 11 shows an output characteristic that illustrates the logarithm (ordinate) of the number of signal charges with respect to the logarithm (abscissa) of the luminance for pixels of each color in a CMOS image sensor having the white pixels, red pixels, green pixels, and blue pixels.

The output characteristics of the pixels of various colors R, G, B and W become straight lines with the same slope. The number of signal charge saturates at a certain illumination value.

In the CMOS image sensor of this embodiment, an additional capacitance is included in each pixel of the white pixels, red pixels, green pixels and blue pixels to expand the dynamic range. For a pixel of any color, the saturation amount of signal charge is more than that in the case when an additional capacitance is included.

In the CMOS image sensor, the dynamic range DR of brightness information is from floor noise level FN of a white pixel to the saturation level. In the case shown in FIG. 11, the dynamic range is about 100 dB. This is wider than the 80 dB dynamic range of conventional technology.

Figure 12:
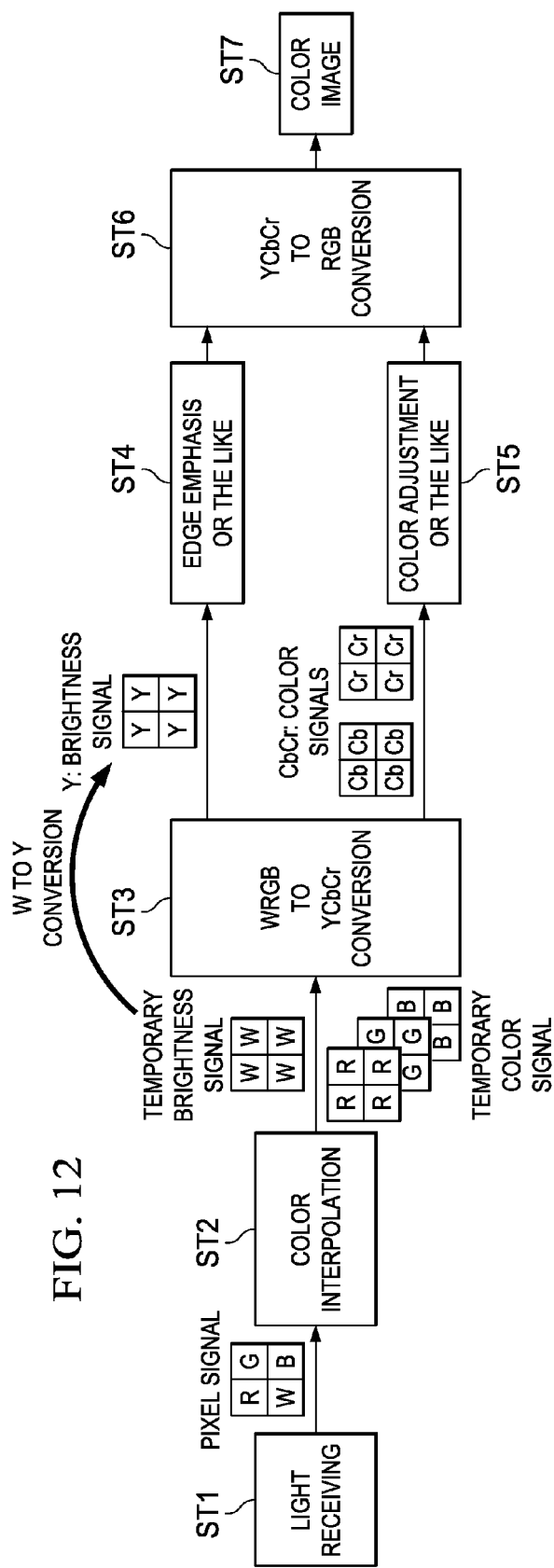
FIG. 12 is a schematic diagram illustrating the flow of information in a color image including processing image data from signals obtained from white pixels, red pixels, green pixels and blue pixels in the CMOS image sensor of the first embodiment of the present invention.

FIG. 12 is a schematic diagram illustrating the flow of information in a color image including processing image data from signals obtained from white pixels, red pixels, green pixels and blue pixels in the CMOS image sensor of the first embodiment of the present invention.

Step ST1 receives light is received in each pixel of white pixels W, red pixels R, green pixels G and blue pixels B with the aforementioned configuration. This produces a pixel signal of each pixel.

Step ST2 interpolates the color of each pixel signal to produce temporary brightness signal (W) and temporary color signals (R, G, B).

Step ST3 converts the WRGB signals into YCbCr signals. More specifically, temporary brightness signal W is converted into brightness signal Y, and temporary color signals RGB are converted into color signals CbCr.

Step ST4 carries out edge emphasis for brightness signal Y and other data processing. Step ST5 adjusts the color signals CbCr and other data processing. This produces image data composed of brightness signal Y and color signals CbCr.

Step ST6 converts the image data composed of brightness signal Y and color signals CbCr into RGB data to reproduce the image data in a reproduction device.

Step ST7 reproduces the RGB data to produce a color image.

In the solid-state image pickup device of this embodiment, the CMOS image sensor has white pixels having no color filter as well as red pixels, blue pixels, and green pixels. An additional capacitance that can separate capacitance from the floating diffusion is included in the white pixels, red pixels, blue pixels and green pixels to expand the dynamic range. This solves the problem of limitation of the dynamic range in the high luminance region.

Second Embodiment

The solid-state image pickup device of this embodiment is a CMOS image sensor. White pixels having no color filter, red pixels having red color filters, green pixels having green color filters and blue pixels having blue color filters are integrated in array form on the light receiving surface of a semiconductor substrate.

In this embodiment, the additional capacitance included in white pixels is larger than the additional capacitance included in red pixels, green pixels and blue pixels.

The rest of the image sensor is virtually the same as in the first embodiment.

In the CMOS image sensor of this embodiment, an additional capacitance having the configuration to be described below and included in white pixels is larger than the additional capacitance included in red pixels, green pixels and blue pixels.

Figure 13:
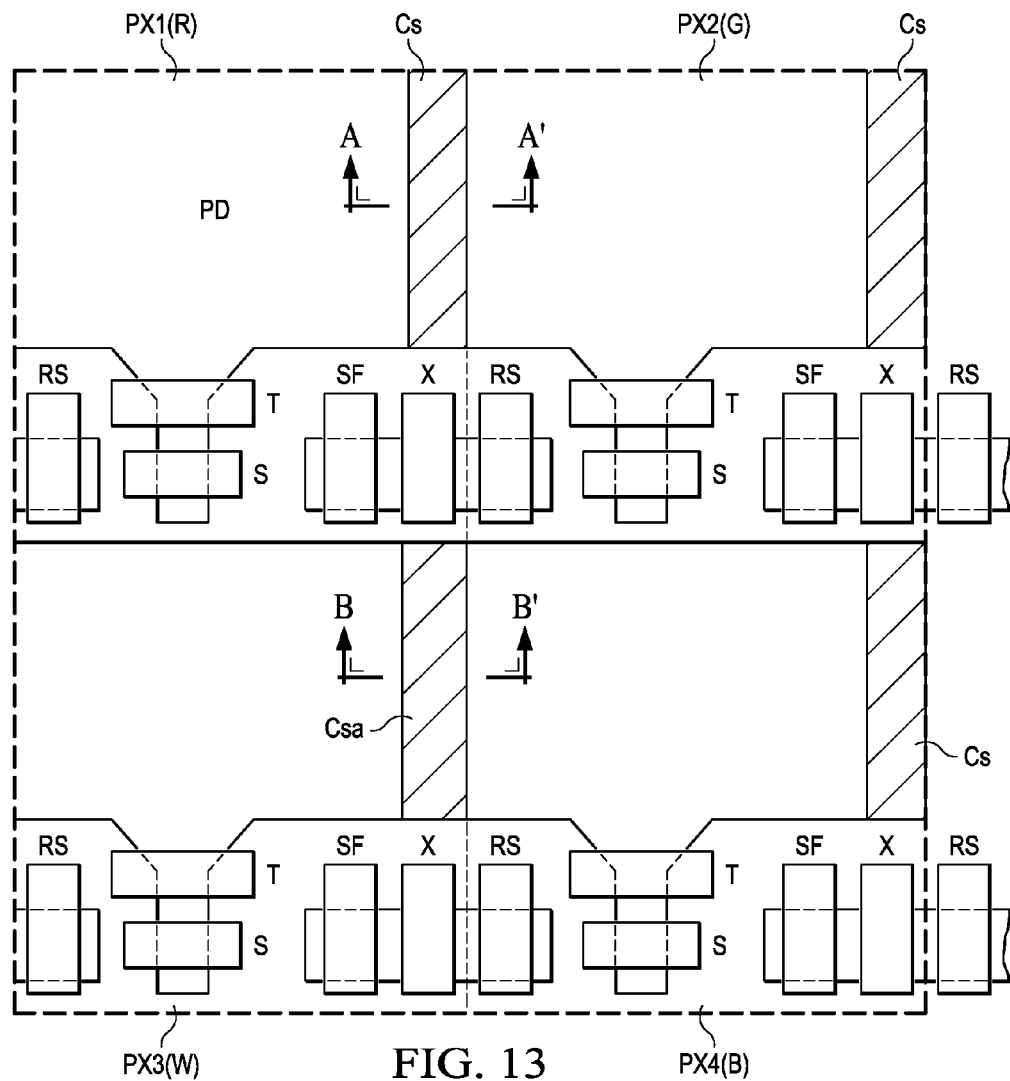
FIG. 13 is a layout diagram of the CMOS image sensor disclosed in a second embodiment of the present invention.

FIG. 13 is a layout diagram illustrating the state in which a group of four pixels (PX1 to PX4) of white pixel W, red pixel R, green pixel G and blue pixel B are arranged in 2 rows by 2 columns. The group of the four pixels (PX1 to PX4) repeats in the row direction and column direction on the light receiving surface.

Each of the four pixels (PX1 to PX4) has photodiode PD, additional capacitance $C_S$ ($C_{Sa}$), transfer transistor T, capacitance-coupling transistor S, reset transistor RS, amplification transistor source follower SF and selection transistor X. A power supply voltage VR line connected to reset transistor RS and selection transistor X is shared between adjacent pixels in the row direction.

In white pixel W (PX3) additional capacitance $C_{Sa}$ is formed larger than the additional capacitances of other pixels (PX1, PX2, PX4).

Figure 14A:
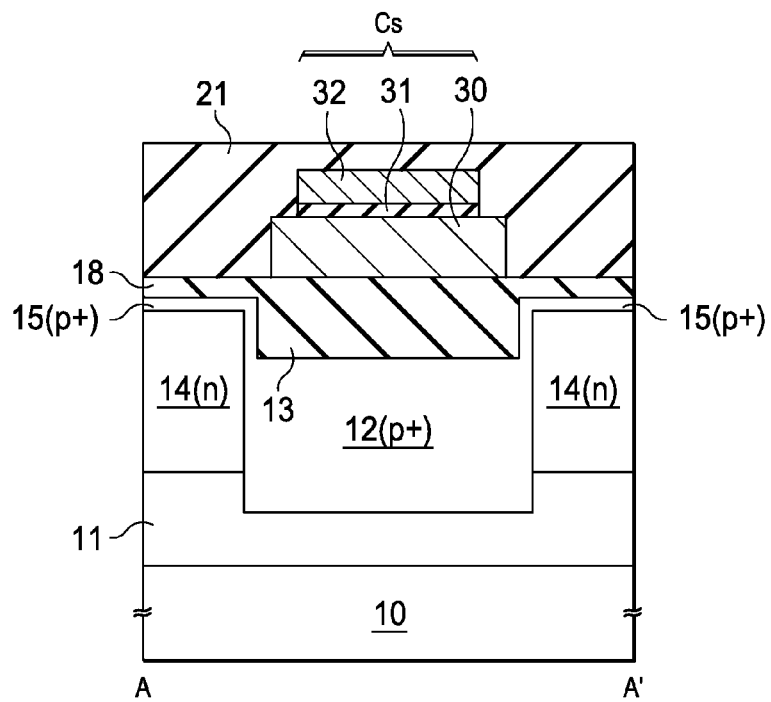
FIG. 14A is a schematic cross-sectional view along line A-A' in FIG. 13 of a part of each pixel in the CMOS image sensor of the second embodiment of the present invention.

FIG. 14A is equivalent to the cross-sectional view along line A-A' of FIG. 13.

The region between photodiode PD having n-type semiconductor region 14 and p$^+$-type semiconductor region 15 formed in p-type well 11 and photodiode PD having n-type semiconductor region 14 and p$^+$-type semiconductor region 15 in the adjacent pixel becomes the element isolation region. P$^+$-type isolation region 12 and STI type element isolation insulating film 13 are formed in this region.

First electrode 30 made of polysilicon, capacitance insulating film 31 and a second electrode 32 made of polysilicon are laminated on the top of element isolation insulating film 13 to form additional capacitance $C_S$.

Insulating film 21 covers additional capacitance $C_S$. Wiring connected to the n$^+$-type semiconductor region 17 is connected to first electrode 30 or second electrode 32.

Figure 14B:
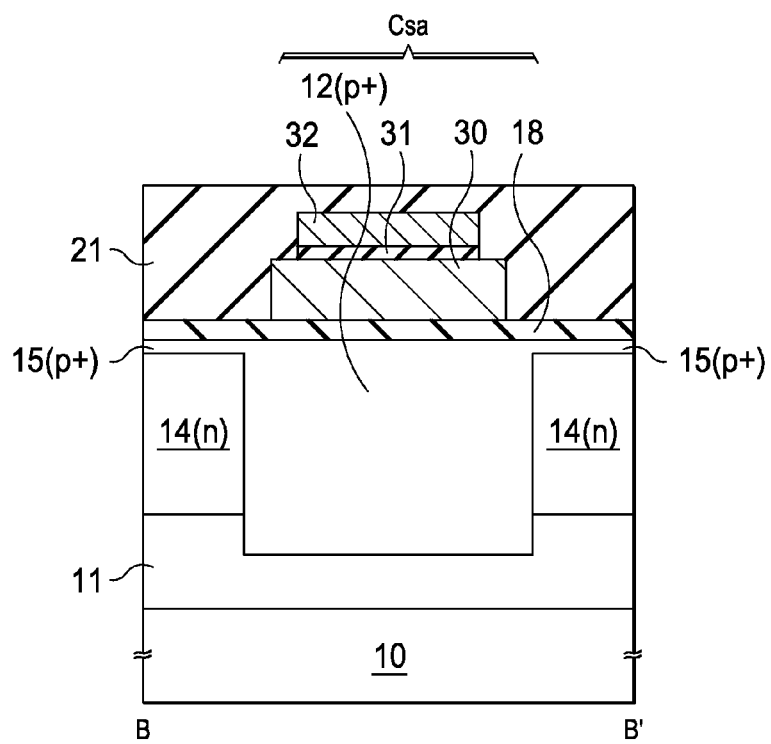
FIG. 14B is a cross-sectional view along line B-B' in FIG. 13.

FIG. 14B is the cross-sectional view along line B-B' of FIG. 13.

The region between photodiode PD having n-type semiconductor region 14 and p$^+$-type semiconductor region 15 formed in p-type well 11 and photodiode PD having n-type semiconductor region 14 and p$^+$-type semiconductor region 15 in the adjacent pixel becomes the element isolation region. P$^+$-type isolation region 12 is formed in this region.

First electrode 30 made of polysilicon, capacitance insulating film 31 and second electrode 32 made of polysilicon are laminated on the top of p$^+$-type isolation region 12 via an insulating film that forms gate insulating film 18. Second electrode 32 is connected to p$^+$-type isolation region 12. This forms an additional capacitance $C_{Sa}$ having a capacitance equal to the sum of the electrostatic capacitance between p$^+$-type isolation region 12 and first electrode 30 and the electrostatic capacitance between first electrode 30 and the second electrode 32. If the electrostatic capacitance between first electrode 30 and second electrode 32 is 4 fF/μm$^2$, the sum of the electrostatic capacitance between p$^+$-type isolation region 12 and first electrode 30 and the electrostatic capacitance between first electrode 30 and second electrode 32 becomes 8 fF/μm$^2$. This construction thus doubles the capacitance.

Insulating film 21 covers additional capacitance $C_{Sa}$ with the aforementioned configuration. Wiring connected to n$^+$-type semiconductor region 17 is connected to first electrode 30.

There are other methods to form additional capacitance $C_{Sa}$ with larger capacitance than additional capacitance $C_S$. The opposite surfaces of the first and second electrodes may be roughened to increase the opposing areas to raise the capacitance. The capacitance may be formed into a fin shape or a crown shape or other three-dimensional shape. The additional capacitance for the white pixel may be formed larger than the additional capacitance for red pixels, green pixels and blue pixels.

Figure 15:
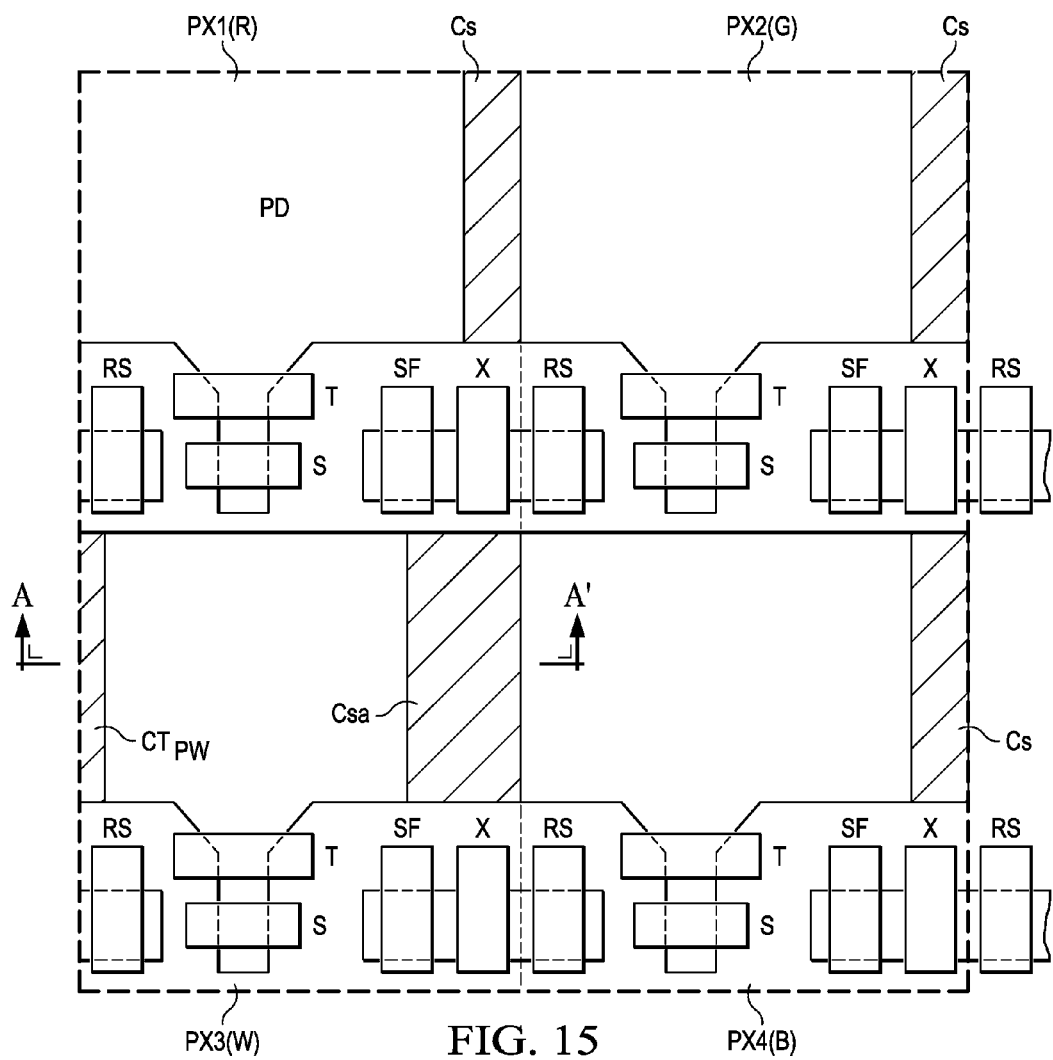
FIG. 15 is a layout diagram of the CMOS image sensor of the second embodiment of the present invention.

FIG. 15 is a layout diagram illustrating the state in which a group of four pixels (PX1 to PX4) including white pixel W, red pixel R, green pixel G and blue pixel B arranged in 2 rows by 2 columns. The group of the four pixels (PX1 to PX4) repeats in the row direction and in the column direction on the light receiving surface.

Each of the four pixels (PX1 to PX4) has photodiode PD, additional capacitance $C_S$ ($C_{Sa}$) transfer transistor T, capacitance-coupling transistor S, reset transistor RS, amplification transistor source follower SF and selection transistor X. A power supply voltage VR line connected to reset transistor RS and selection transistor X is shared between adjacent pixels in the row direction.

In white pixel W (PX3) additional capacitance $C_{Sa}$ is larger than the additional capacitances of other pixels (PX1, PX2, PX4).

Additional capacitance $C_{Sa}$ is formed in a larger area than additional capacitance $C_S$ within an appropriate range. Thus the actual aperture of the white pixel is not reduced. This realizes additional capacitance $C_{Sa}$ having larger capacitance than additional capacitance $C_S$. In this example, the capacitance increases proportionally to the area occupied by the capacitance.

In this example, additional capacitance $C_{Sa}$ projects further to the side of photodiode PD compared with additional capacitance $C_S$. To avoid deterioration in the parallel symmetry of the image data of the CMOS image sensor of FIG. 15, the area of photodiode PD from the end part on the opposite side is narrowed with respect to the additional capacitance $C_{Sa}$ of photodiode PD that constitutes white pixel W.

In FIG. 15, p-type well contact $CT_{PW}$ is formed in the end part on the opposite side with respect to the additional capacitance $C_{Sa}$ of the photodiode PD in order to effectively use the area inside the pixel.

Figure 16:
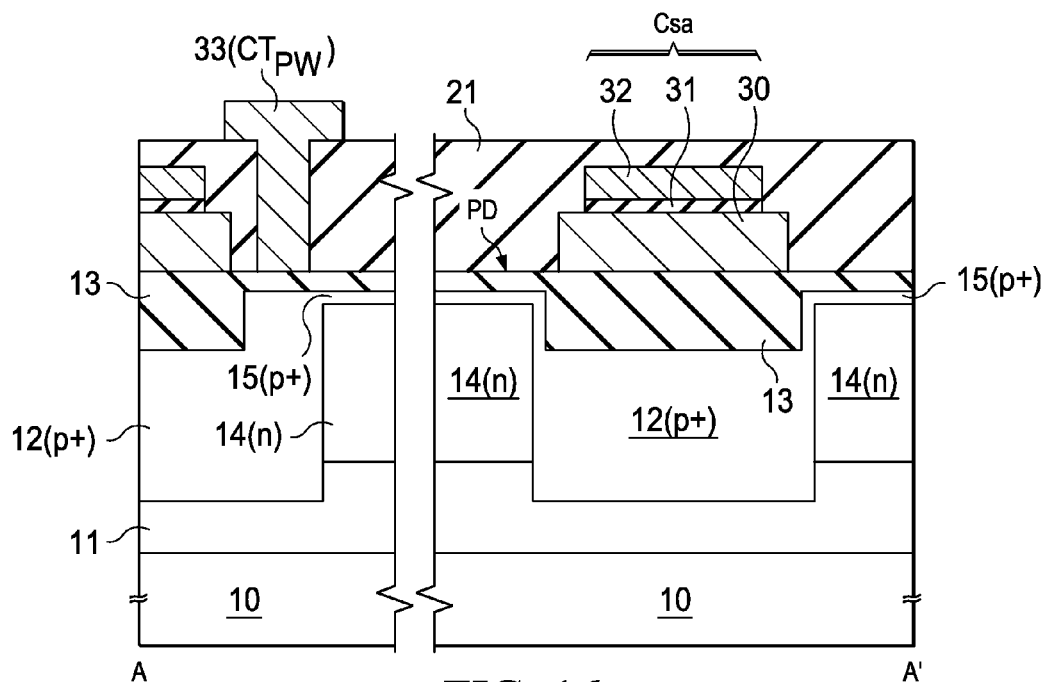
FIG. 16 is a schematic cross-sectional view along line A-A' in FIG. 15 of a part of each pixel in the CMOS image sensor disclosed in the second embodiment of the present invention.

FIG. 16 is the cross-sectional view along line A-A' in FIG. 15.

The region between photodiode PD having n-type semiconductor region 14 and p$^+$-type semiconductor region 15 formed in p-type well (p-well) 11 and photodiode PD having n-type semiconductor region 14 and p$^+$-type semiconductor region 15 in the adjacent pixel becomes the element isolation region. P$^+$-type isolation region 12 and STI type element isolation insulating film 13 are formed in this region.

First electrode 30 made of polysilicon, capacitance insulating film 31, and second electrode 32 made of polysilicon are laminated on the top of element isolation insulating film 13 to form additional capacitance $C_S$.

Insulating film 21 covers the additional capacitance $C_S$. Wiring connected to the n$^+$-type semiconductor region 17 is connected to first electrode 30 or second electrode 32.

A region where p$^+$-type isolation region 12 stick outs to the substrate surface is included in the end part on the opposite side with respect to the additional capacitance $C_{Sa}$ of photodiode PD of white pixel W. An opening that reaches p$^+$-type isolation region 12 is formed. Wiring 33 is formed in this opening. This forms p-type well contact $CT_{PW}$. When a region acting as the p-type well contact $CT_{PW}$ is constructed as described above, the area of photodiode PD is narrowed from the end part opposite the additional capacitance $C_{Sa}$.

When additional capacitance $C_{Sa}$ sticks out to the side of photodiode PD as described above, it is believed that this reduces the quantity of light incident onto photodiode PD. In a pixel having an on-chip lens, however when a certain amount of light is incident, the quantum efficiency corresponding to the magnitude of the signal obtained in the photodiode tends to remain constant at an aperture ratio of 40% or more when the aperture of the wiring with respect to the photodiode is changed. Consequently, it is possible to avoid a signal drop and decrease in the incident light quantity in the configuration shown in FIG. 15 where additional capacitance $C_{Sa}$ sticks out into photodiode PD by adjusting the on-chip lens.

Figure 17:
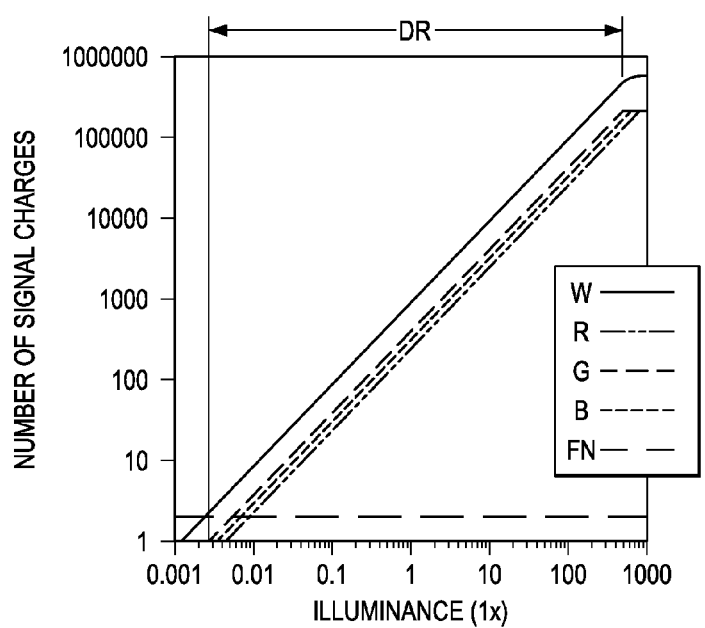
FIG. 17 shows an output characteristic illustrating the logarithm (ordinate) of the number of signal charges with respect to the logarithm (abscissa) of the luminance of the CMOS image sensor in the second embodiment of the present invention.

FIG. 17 is an output characteristic illustrating the logarithm of the number of signal charges (ordinate) with respect to the logarithm of luminance (abscissa) for the pixels of the various colors. The output characteristics in the pixels of various colors R, G, B and W form straight lines with the same slope. The number of signal charges is saturated at a certain value.

In the CMOS image sensor of this embodiment, an additional capacitance is included in the white pixels, red pixels, green pixels and blue pixels to expand the dynamic range. For any color pixel the saturation amount of signal charges is greater than that in the case without additional capacitance. Since the additional capacitance in white pixels is larger than the additional capacitance of the other pixels, the saturation amount of signal charges in white pixels is further increased.

The brightness dynamic range DR can be further expanded as compared with the first embodiment. The example of FIG. 17 shows a dynamic range of about 106 dB.

In this embodiment the capacitance of the additional capacitance is increased only for white pixels. It is also possible to optimize the capacitance of the additional capacitance in each colored pixel depending on their difference in sensitivity. Depending significantly on the color temperature of the environmental light, red pixels can include reduced capacitance and green pixels can include increased capacitance.

In this embodiment of the invention, the CMOS image sensor has white pixels having no color filter and red pixels, blue pixels and green pixels having corresponding color filters. The white pixels, red pixels, blue pixels and green pixels include an additional capacitance whose capacitance can be separated from the floating diffusion to expand the dynamic range. This solves the problem of limited dynamic range for high luminance.

Third Embodiment

The solid-state image pickup device of this embodiment is a CMOS image sensor. White pixels having no color filter and red pixels, green pixels and blue pixels having corresponding red, green and blue color filters are integrated in array form on the light receiving surface of a semiconductor substrate.

In this embodiment, the number of white pixels W is greater than or equal to the total number of red pixels R, green pixels G and blue pixels B. The rest of the image sensor is virtually the same as in the first embodiment.

Figure 18A:
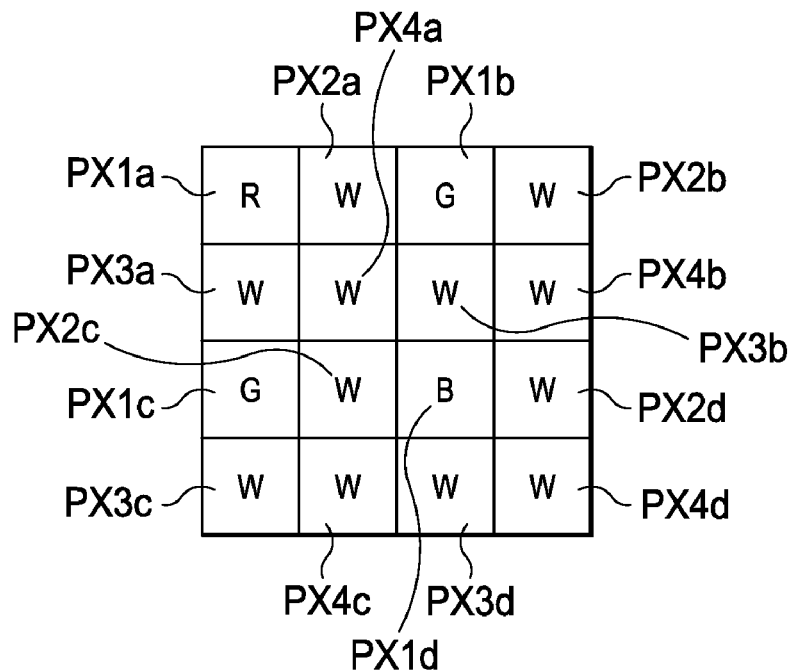
FIGS. 18A and 18B are layout diagrams of examples of the CMOS image sensor in a third embodiment of the present invention.

FIG. 18A is a layout diagram illustrating 16 pixels arranged in 4 rows by 4 columns as an example of the CMOS image sensor of this embodiment.

The ratio of the number of white pixels to the total number of red pixels R, green pixels G and blue pixels B is 3:1. A first 2 by 2 group of pixels includes red pixel PX1$a$ and white pixels PX2$a$, PX3$a$ and PX4$a$. A second 2 by 2 group of pixels includes green pixel PX2$a$ and three white pixels PX2$b$, PX3$b$ and PX4$b$. A third 2 by 2 group of pixels includes green pixel PX1$c$ and three white pixels PX2$c$, PX3$c$ and PX4$c$. A fourth 2 by 2 group of pixels includes blue pixel PX1$d$ and three white pixels PX2$d$, PX3$d$ and PX4$d$. The 16 pixels are arranged in 4 rows by 4 columns. The 16 pixels of 4 rows by 4 columns are taken as one group. The group of pixels shown in FIG. 18A is formed repeatedly in the row direction and in the column direction on the light receiving surface.

Figure 18B:
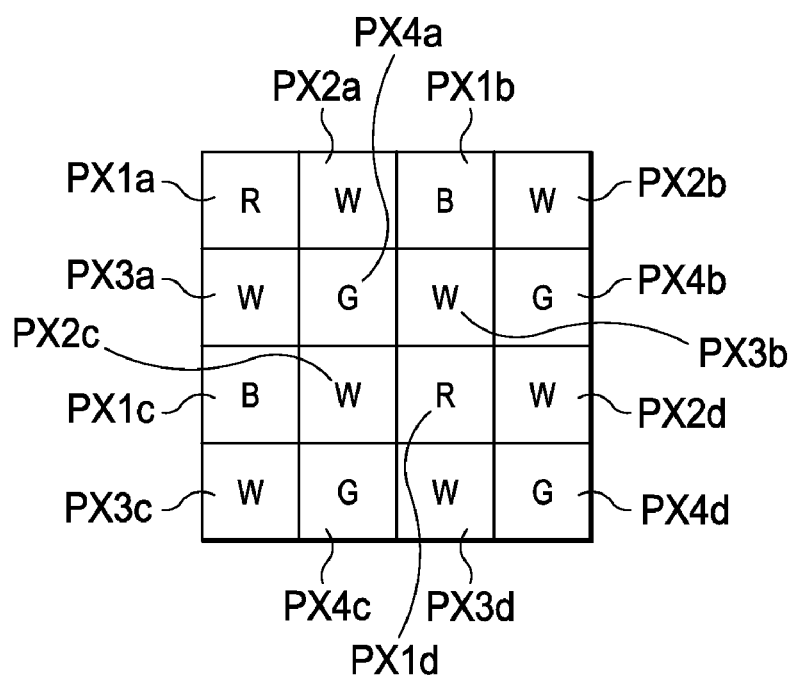

FIG. 18B is a layout diagram illustrating 16 pixels of 4 rows by 4 columns as another example of the CMOS image sensor of this embodiment.

The ratio of the number of white pixels to the total number of red pixels R, green pixels G and blue pixels B is 1:1. A first 2 by 2 group of pixels includes red pixel PX1$a$, two white pixels PX2$a$ and PX3$a$ and green pixel PX4$a$. A second 2 by 2 group of pixels includes blue pixel PX1$b$, two white pixels PX2$b$ and PX3$b$ and green pixel PX4$b$. A third 2 by 2 group of pixels includes blue pixel PX1$c$, two white pixels PX2$c$ and PX3$c$ and green pixel PX4$c$. A fourth 2 by 2 group of pixels includes red pixel PX1$d$, two white pixels PX2$d$ and PX3$d$ and green pixel PX4$d$. The 16 pixels are arranged in 4 rows by 4 columns. The 16 pixels of 4 rows by 4 columns are taken as one group. The group of pixels shown in FIG. 18B is formed repeatedly in the row direction and the column direction on the light receiving surface.

Figure 19A:
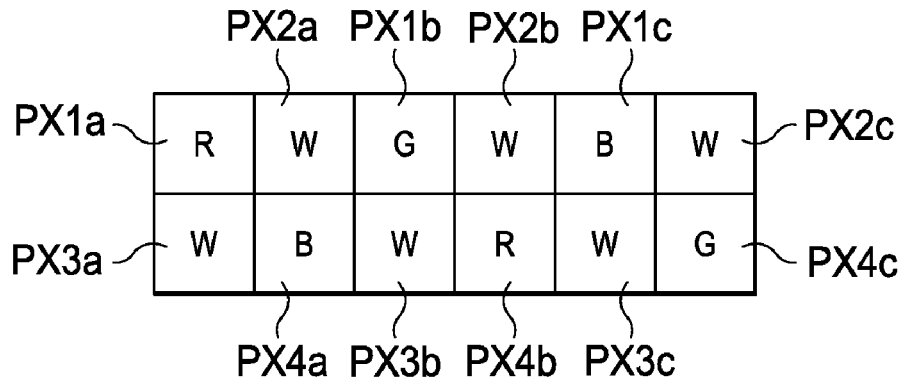
FIGS. 19A and 19B are further layout diagrams of examples of the CMOS image sensor in the third embodiment of the present invention.

FIG. 19A is a layout diagram illustrating 12 pixels of 2 rows by 6 columns as an example of the CMOS image sensor of this embodiment.

The ratio of the number of white pixels to the total number of red pixels R, green pixels G and blue pixels B is 1:1. A first 2 by 2 group of pixels includes red pixel PX1$a$, two white pixels PX2$a$ and PX3$a$ and blue pixel PX4$a$. A second 2 by 2 group of pixels includes green pixel PX1$b$, two white pixels PX2$b$ and PX3$b$ and red pixel PX4$b$. A third 2 by 2 group of pixels includes blue pixel PX1$c$, two white pixels PX2$c$ and PX3$c$ and green pixel PX4$c$. The 12 pixels are arranged in 2 rows by 6 columns. The 12 pixels of 2 rows by 6 columns are taken as one group. The group of pixels shown in FIG. 19A is formed repeatedly in the row direction and the column direction on the light receiving surface.

Figure 19B:
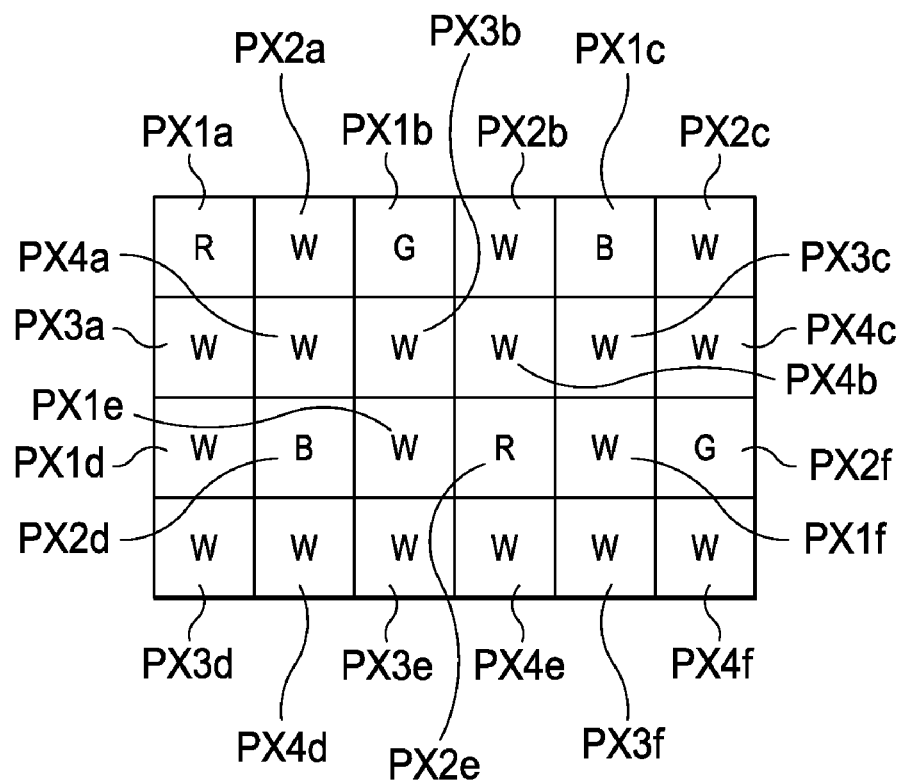

FIG. 19B is a layout diagram illustrating 24 pixels arranged in 4 rows by 6 columns as an example of the CMOS image sensor of this embodiment.

The ratio of the number of white pixels to the total number of red pixels R, green pixels G and blue pixels B is 3:1. A first 2 by 2 group of pixels includes red pixel PX1$a$ and three white pixels PX2$a$, PX3$a$ and PX4$a$. A second 2 by 2 group of pixels includes green pixel PX1$b$ and three white pixels PX2$b$, PX3$b$ and PX4$b$. A third 2 by 2 group of pixels includes blue pixel PX1$c$ and three white pixels PX2$c$, PX3$c$ and PX4$c$. A fourth 2 by 2 group of pixels includes white pixel PX1$d$, blue pixel PX2$d$ and two white pixels PX3$d$ and PX4$d$. A fifth 2 by 2 group of pixels includes white pixel PX1$e$, red pixel PX2$e$ and two white pixels PX3$e$ and PX4$e$. A sixth 2 by 2 group of pixels includes white pixel PX1$f$, green pixel PX2$f$ and two white pixels PX3$f$ and PX4$f$. These 2 by 2 groups of pixels are arranged with 2 groups in the row direction and 3 groups in the column direction. The 24 pixels are arranged in 4 rows by 6 columns. The 24 pixels of 4 rows by 6 columns are taken as one group. The group of pixels shown in FIG. 19B is formed repeatedly in the row direction and the column direction on the light receiving surface.

In the CMOS image sensor of this embodiment, the signals of the pixels corresponding to these aforementioned layouts are selected from the pixel signal obtained from each pixel in the same way as described in the first embodiment to obtain image data composed of brightness signal Y and color signals CbCr.

In the solid-state image pickup device of this embodiment, the CMOS image sensor has white pixels having no color filter and red pixels, blue pixels and green pixels with corresponding red, blue and green filters. An additional capacitance whose capacitance can be separated from the floating diffusion is included in the white pixels, red pixels, blue pixels and green pixels to expand the dynamic range. This solves the problem of limited dynamic range for high luminance.

Fourth Embodiment

The solid-state image pickup device of this embodiment is a CMOS image sensor. White pixels having no color filter and red pixels, green pixels and blue pixels having corresponding red, green and blue color filters are integrated in array form on the light receiving surface of a semiconductor substrate.

In this embodiment, the number of white pixels is greater than or equal to the total number of red pixels, green pixels and blue pixels. The additional capacitance for white pixels is larger than the additional capacitance for red pixels, green pixels and blue pixels.

The rest of the image sensor is virtually the same as the first embodiment.

Figure 20:
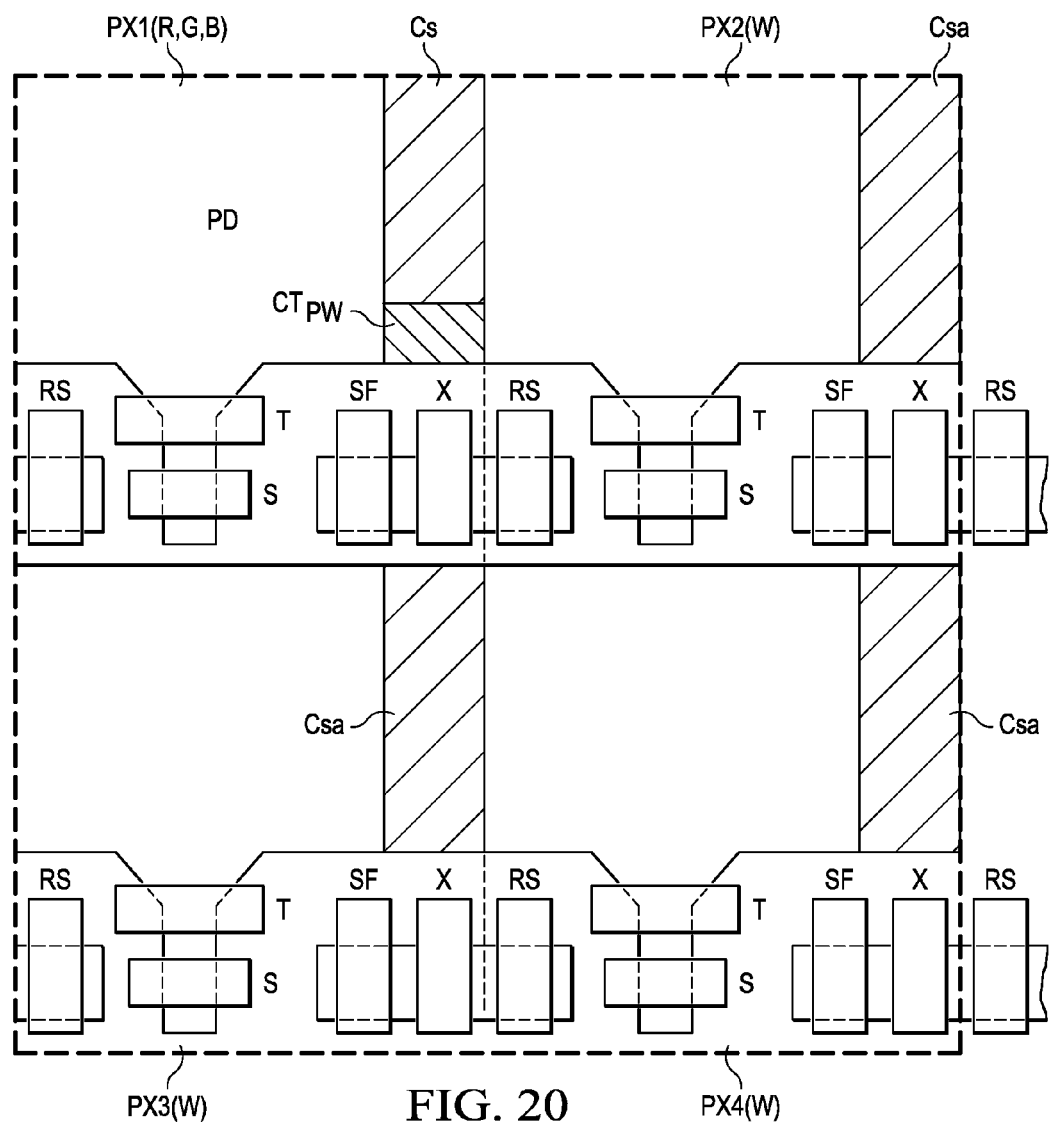
FIG. 20 is a layout diagram of the CMOS image sensor in a fourth embodiment of the present invention.

FIG. 20 is a layout diagram illustrating a group of four pixels of this embodiment.

In the layout shown in FIG. 18A disclosed in the third embodiment, the additional capacitance included in a white pixel is formed larger than the additional capacitance elements included in red pixels, green pixels and blue pixels.

Each of the four pixels (PX1 to PX4) has photodiode PD, additional capacitance $C_S$, transfer transistor T, capacitance-coupling transistor S, reset transistor RS, amplification transistor source follower SF and selection transistor X. A power supply voltage VR line connected to reset transistor RS and selection transistor X is shared between adjacent pixels in the row direction.

In this example, pixel PX1 is a red pixel, green pixel, or blue pixel corresponding to the layout shown in FIG. 18A. Pixels PX2, PX3 and PX4 are white pixels.

In this example, additional capacitance $C_{Sa}$ included in a white pixel has a larger area than additional capacitance $C_S$. In this way, additional capacitance $C_{Sa}$ has a larger capacitance than additional capacitance $C_S$. In this example, the capacitance is proportion to the area occupied by the capacitance element.

In pixel PX1 that can be red pixel R, green pixel G or blue pixel B, additional capacitance $C_S$ is formed in a smaller area. This provides space include a p-type well contact $CT_{PW}$ in pixel PX1.

As the solid-state image pickup device of this embodiment, the CMOS image sensor has white pixels having no color filter and red pixels, blue pixels and green pixels having corresponding color filters. An additional capacitance whose capacitance can be separated from the floating diffusion is included in the white pixels, red pixels, blue pixels and green pixels to expand the dynamic range. This solves the problem of limited dynamic range upon high luminance.

Fifth Embodiment

The solid-state image pickup device of this embodiment is a CMOS image sensor. White pixels having no color filter and red pixels, green pixels and blue pixels having corresponding red, green and blue color filters are integrated in array form on the light receiving surface of a semiconductor substrate.

In this embodiment, an additional capacitance whose capacitance can be separated from the floating diffusion is included only in white pixels having no color filter to expand the dynamic range. An additional capacitance is not included in red pixels, green pixels or blue pixels.

Figure 21A:
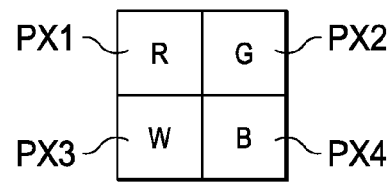
FIGS. 21A and 21B are layout diagrams of the CMOS image sensor in a fifth embodiment of the present invention.

FIG. 21A is a layout diagram illustrating 4 pixels of 2 rows by 2 columns in the CMOS image sensor disclosed in this embodiment. It is the same as FIG. 4(A) of the first embodiment.

Figure 21B:
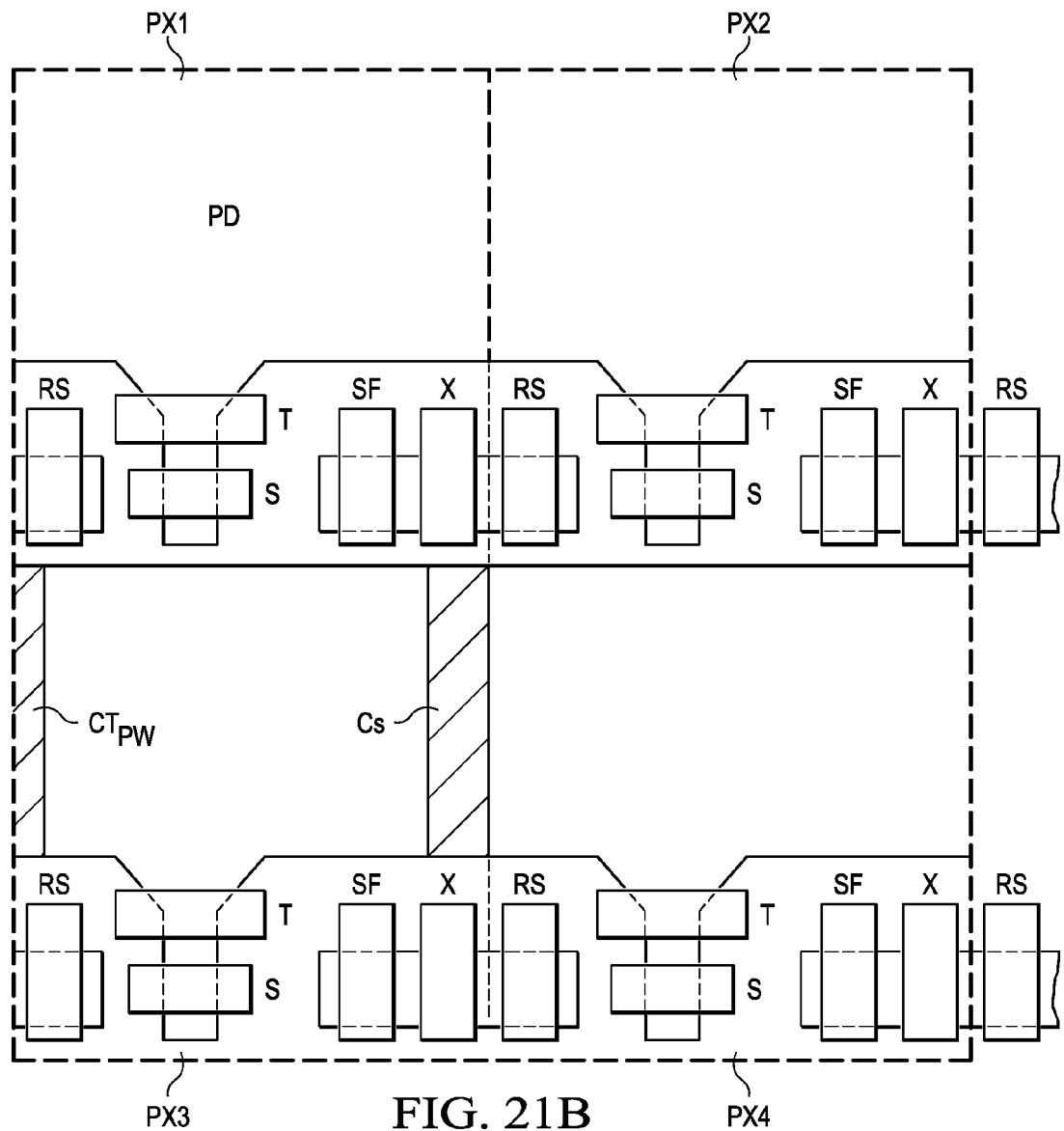

FIG. 21B is a layout diagram illustrating four sets of pixels in this embodiment.

Additional capacitance $C_S$ whose capacitance can be separated from floating diffusion FD is included only in white pixel PX3 to expand the dynamic range. An additional capacitance is not includes in red pixel PX1, green pixel PX2 or blue pixel PX4.

The capacitance-coupling transistor S used for capacitance separation between floating diffusion FD and additional capacitance $C_S$ is omitted in pixels PX1, PX2, and PX4.

To avoid deterioration in the parallel symmetry, the area of photodiode PD is narrowed from the end part on the opposite side with respect to the additional capacitance $C_S$ of photodiode PD of white pixel PX3 as white pixel W. A p-type well contact $CT_{PW}$ is included.

FIG. 22A is an equivalent circuit diagram of white pixel PX3. It is the same as the equivalent circuit diagram of FIG. 1 disclosed in the first embodiment.

On the other hand, FIG. 22B is an equivalent circuit diagram of red pixel PX1, green pixel PX2 and blue pixel PX4. In contrast to FIG. 22A, additional capacitance $C_S$ is omitted. Thus capacitance-coupling transistor S is also omitted.

If an additional capacitance whose capacitance can be separated from the floating diffusion is included only in white pixels having no color filter and an additional capacitance is not included in red pixels, blue pixels or green pixels, the floating diffusion can be shared between the white pixels and the red pixels, blue pixels or green pixels.

Figure 23:
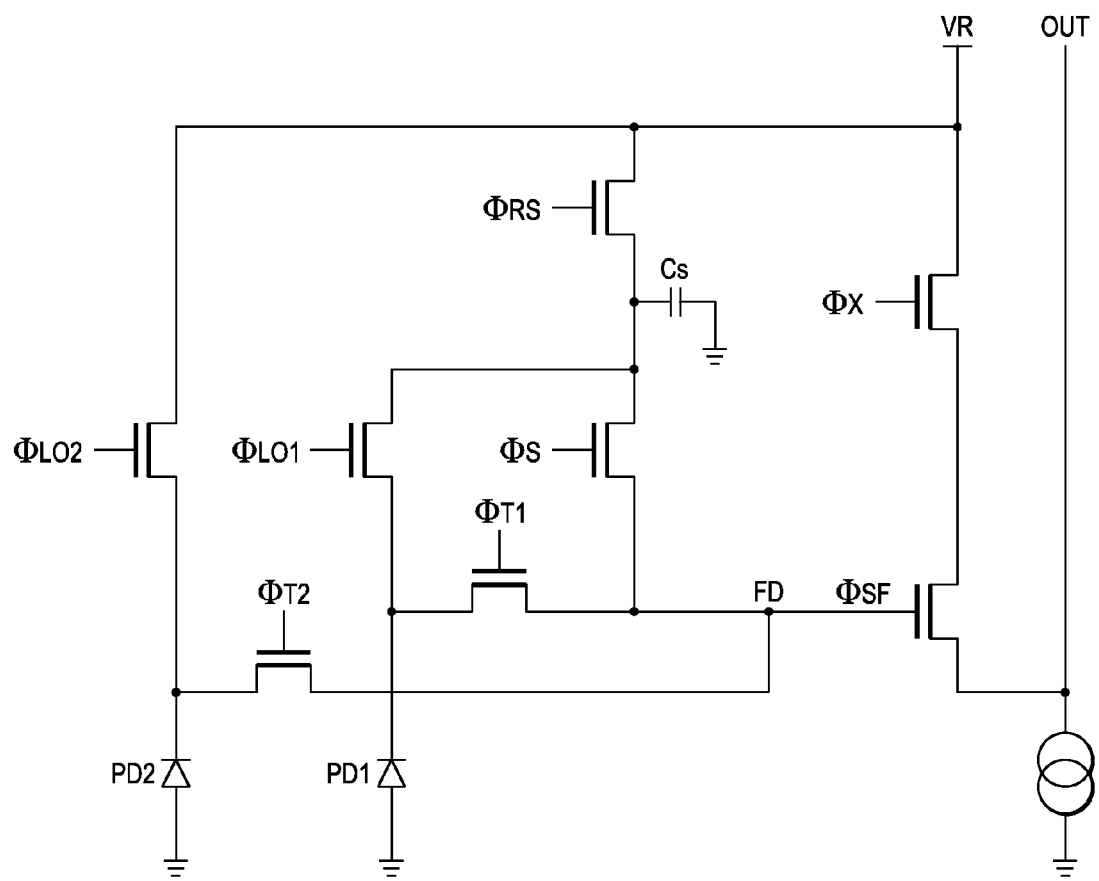
FIG. 23 is an equivalent circuit diagram illustrating a configuration with the floating diffusion shared between the white pixels and the red, green or blue pixels in the CMOS image sensor of the fifth embodiment of the present invention.

FIG. 23 is an equivalent circuit diagram of a white pixel and red pixel, blue pixel or green pixel in a configuration where a floating diffusion is shared between the white pixel and red pixel, blue pixel or green pixel.

Photodiode PD1 of the white pixel is connected to common floating diffusion FD via transfer transistor T1. Photodiode PD2 of red pixel, blue pixel or green pixel is connected to the common floating diffusion via transfer transistor T2. In this way, the signal charges transferred from either photodiode PD1 or PD2 can be read out by reading common amplification transistor SF and selection transistor X.

In FIG. 23, photodiode PD1 is connected to additional capacitance $C_S$ via lateral overflow drain LO1 so that signal charges overflowing from photodiode PD1 are stored in additional capacitance $C_S$. On the other hand, the signal charges overflowing from photodiode PD2 are discarded to the power supply voltage VR via lateral overflow drain LO2. A certain potential is applied to both lateral overflow drain LO1 and lateral overflow drain LO2 to form a potential barrier.

Figure 24:
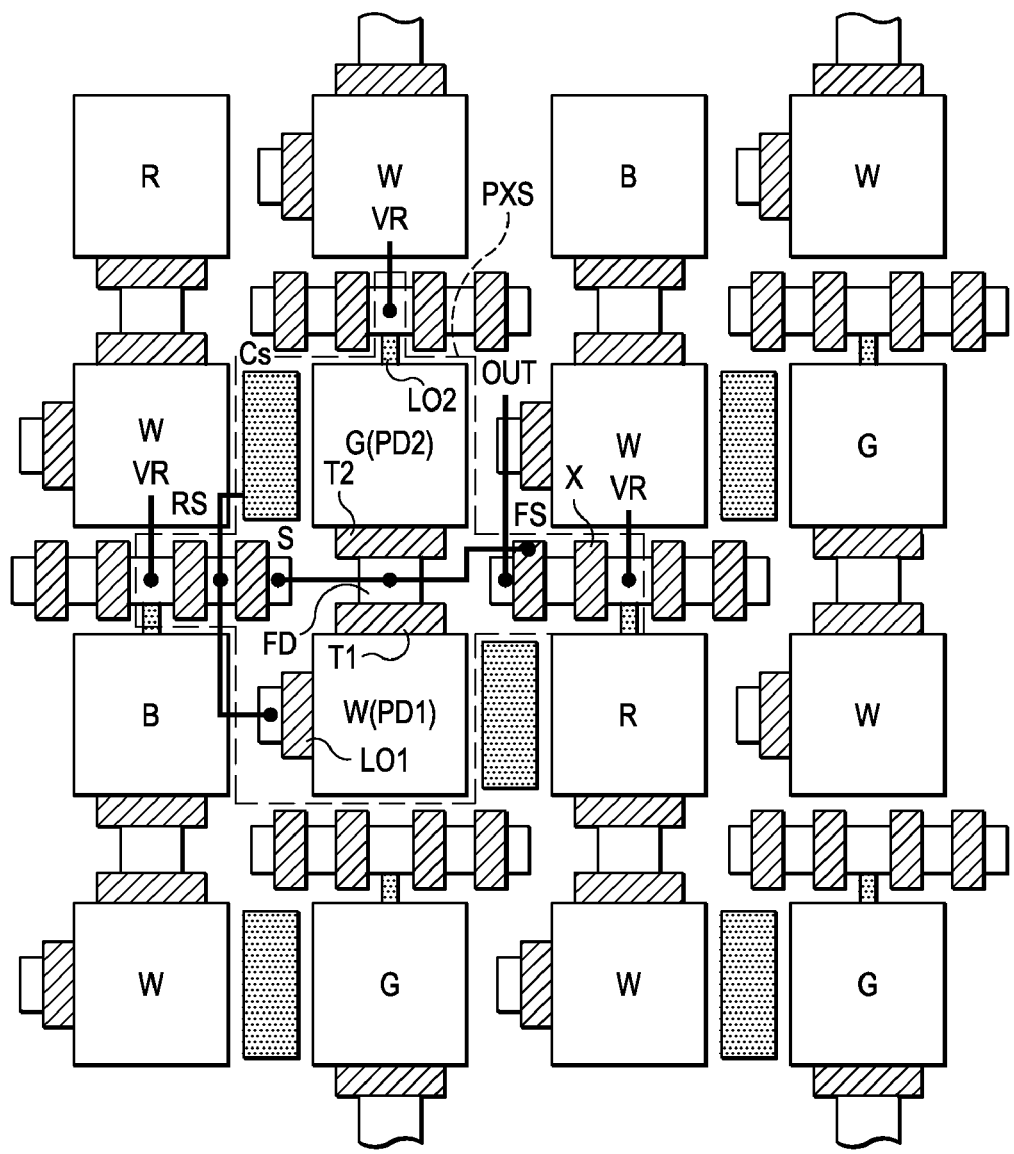
FIG. 24 is a layout diagram of a pixel corresponding to the equivalent circuit diagram shown in FIG. 23.

FIG. 24 is a layout diagram of pixels corresponding to the circuit diagram of FIG. 23.

A configuration with shared floating diffusion between white pixel W and green pixel G is in the region indicated by broken line PXS. Photodiode PD1 of white pixel W is connected to common floating diffusion FD via transfer transistor T1. Photodiode PD2 of green pixel G is connected to the common floating drain via transfer transistor T2.

Photodiode PD1 is connected to additional capacitance $C_S$ via lateral overflow drain LO1. Photodiode PD2 is connected to power supply voltage VR via lateral overflow drain LO2.

Reading from floating diffusion FD using amplification transistor SF and selection transistor X and capacitance coupling between floating diffusion FD and additional capacitance $C_S$ by capacitance coupling capacitor S is the same in the first embodiment.

Figure 25A:
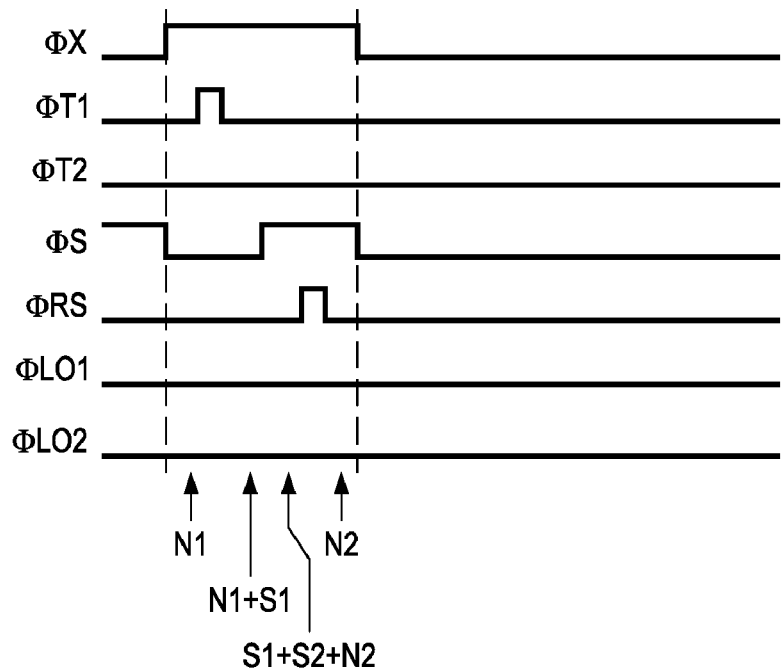
FIGS. 25A and 25B are timing charts showing voltages applied on the two levels for ON/OFF to drive signals in the CMOS image sensor in the fifth embodiment of the present invention.

FIG. 25A is a timing chart of voltages applied to drive signals φX, φT1, φT2, φS and φRS when reading signals from white pixels having an additional capacitance whose capacitance can be separated from the floating diffusion. FIG. 25A also illustrates the voltages applied to lateral overflow drains LO1 and LO2 as corresponding drive signals φLO1 and φLO2.

Operation in virtually the same manner as in the first embodiment is possible by keeping drive signal φT2 in the OFF state. A predetermined voltage is continuously applied to drive signals φLO1 and φLO2.

Figure 25B:
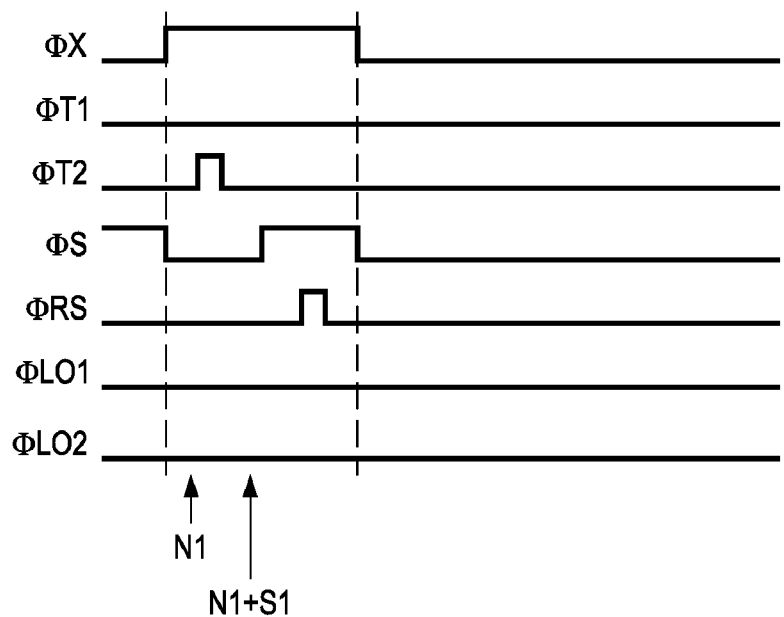

FIG. 25B is a timing chart of voltages applied to drive signals φX, φT1, φT2, φS and φRS when reading signals from a red pixel, blue pixel or green pixel having no additional capacitance. FIG. 25B also illustrates voltages applied to lateral overflow drains LO1 and LO2 as corresponding drive signals φLO1 and φLO2.

Operation in virtually the same manner as in the first embodiment is possible by keeping drive signal φT1 in the OFF state and only reading out pre-saturation charge signal plus $C_{FD}$ noise ($S_1+N_1$) and $C_{FD}$ noise ($N_1$). A predetermined voltage is continuously applied to drive signals φLO1 and φLO2.

As the solid-state image pickup device of this embodiment, the CMOS image sensor has white pixels having no color filter and red pixels, blue pixels and green pixels having corresponding color filters. An additional capacitance whose capacitance can be separated from the floating diffusion is included in only white pixels to expand the dynamic range. This solves the problem of limited dynamic range upon high luminance.

Sixth Embodiment

The solid-state image pickup device of this embodiment is a CMOS image sensor. White pixels having no color filter and red pixels, green pixels and blue pixels having corresponding red, green and blue color filters are integrated in array form on the light receiving surface of a semiconductor substrate.

In this embodiment, the light receiving surface is divided into a central area and a peripheral area. The proportion of white pixels in relation to all pixels is higher in the peripheral area than in the central area.

The rest of the image sensor is virtually the same as in the first embodiment.

Figures 26A, 26B:
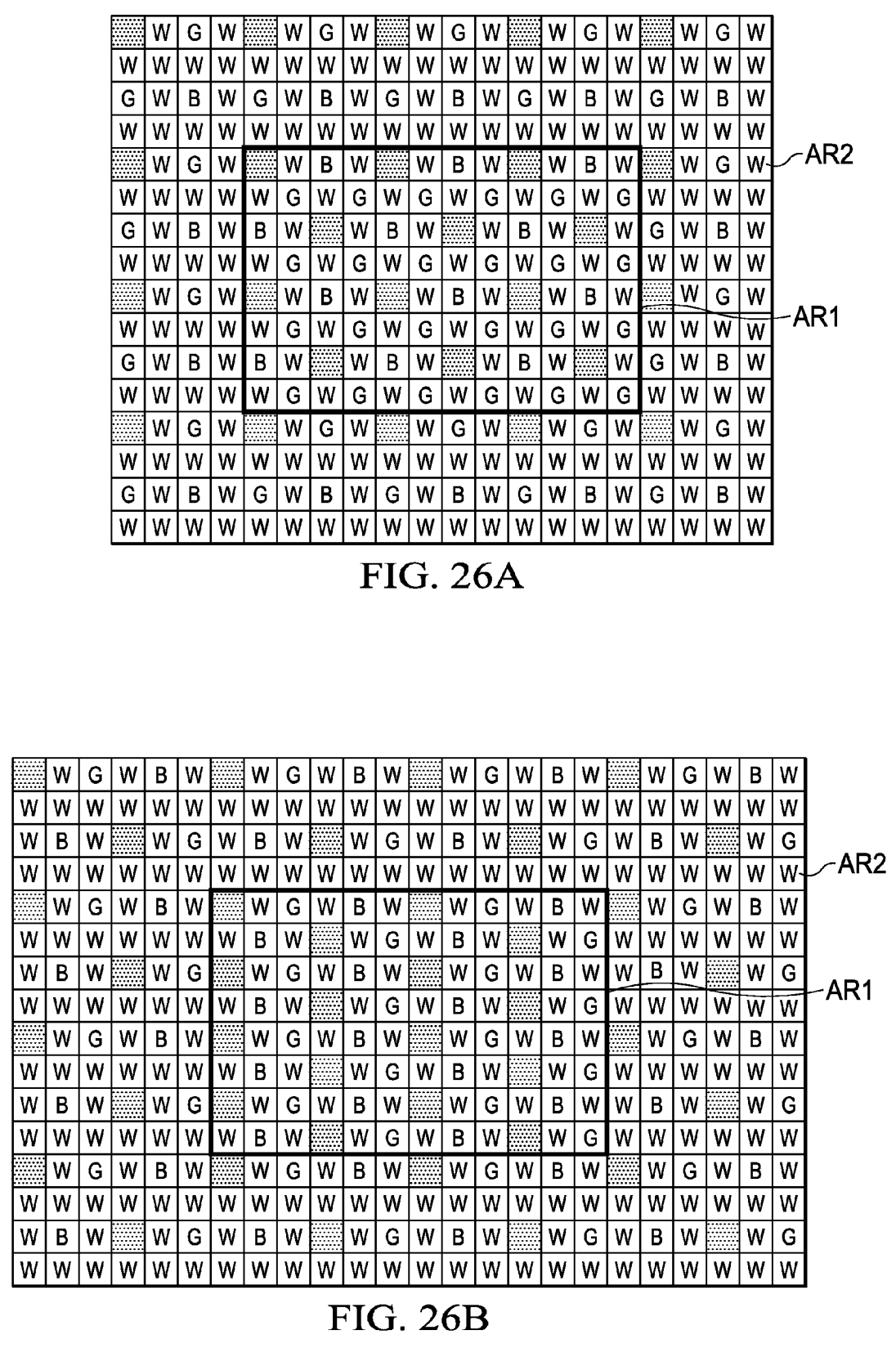

FIG. 26A is a layout diagram illustrating an example of the CMOS image sensor of this embodiment.

The light receiving surface is divided into central area AR1 and peripheral area AR2. The pixels are arranged in the same way as shown in FIG. 18B in central area AR1. The pixels are arranged in the same way as shown in FIG. 18A in peripheral area AR2.

In this way, the proportion of white pixels in relation to all pixels is higher in peripheral area AR2 than in central area AR1.

FIG. 26B is a layout diagram illustrating another example of a CMOS image sensor of this embodiment.

The light receiving surface is divided into central area AR1 and peripheral area AR2. The pixels are arranged in the same way as in shown in FIG. 19A in central area AR1. The pixels are arranged in the same way as shown in FIG. 19B in peripheral area AR2.

In this way, the proportion of white pixels in relation to all pixels is higher in peripheral area AR2 than in the central area AR1.

The human retina has two detecting units with different sensitivity/incident light areas known as rods and cones distributed with varied spatial density. The cones that function in bright illumination and are in charge of bright vision are present in large numbers in the pupil. Their density decreases significantly with movement away from the pupil. On the other hand, rods are present in large quantity in the peripheral area of the retina surrounding the pupil. They function in dark illumination and are in charge of dark vision.

A high-sensitivity method has been proposed for pixels in a conventional image sensor. However, the dynamic range is only shifted in the low luminance region. Since the saturation charge amount is limited by the capacitance of the photodiode or the capacitance of the floating diffusion, pixels for the role of rods of the human eye are difficult to construct.

White pixels having an additional capacitance show a possibility of playing the role of rods. Consequently, a solid-state image device that simulates the human retina includes kinds of pixels with different sensitivity/incident light areas (white pixels and RGB pixels) in a varied spatial distribution like the human retina.

For example, a method can effectively correct the shading which decreases sensitivity in the peripheral area of the image region caused by the lens of a camera or the on-chip microlens using the spatial arrangement shown in FIGS. 26A and 26B.

Seventh Embodiment

The solid-state image pickup device of this embodiment is a CMOS image sensor. Yellow pixels having yellow filters and red pixels, green pixels and blue pixels having corresponding red, green and blue color filters are integrated in array form on the light receiving surface of a semiconductor substrate.

The CMOS image sensor of this embodiment replaces white pixels used in the prior embodiments with yellow pixels having yellow filters.

FIG. 27A is a layout diagram illustrating 4 pixels arranged in 2 rows by 2 columns in the CMOS image sensor of this embodiment.

In this embodiment, the number of yellow pixels is less than the total number of red pixels, green pixels and blue pixels. The ratio of the number of yellow pixels to the total number of red pixel, green pixels and blue pixels is 1:3.

FIG. 27A illustrates the four pixels PX1 to PX4 including one yellow pixel, one red pixel, and green pixel and one blue pixel taken as a group. The group of pixels shown in FIG. 27A repeat in the row direction and the column direction on the light receiving surface.

FIG. 27A illustrates yellow pixel Ye and green pixel G arranged diagonally, and red pixel R and blue pixel B arranged diagonally.

FIG. 27B shows a modification example of FIG. 27A. Yellow pixel Ye and green pixel G are switched as compared with the layout shown in FIG. 27A.

As a further alternative, in FIG. 27A green pixel G can be replaced by yellow pixel Ye or green pixel G can be omitted.

FIG. 28 shows the visual sensitivity characteristic of a human. FIG. 29 shows the spectral sensitivities of white pixels W, red pixels R, green pixels G, blue pixels B and yellow pixels Ye.

Since white pixels are used to form brightness information, image processing can be facilitated if the visual sensitivity characteristic of the imager matches that of a human. Compared with the visual sensitivity characteristic of a human, the short-wavelength sensitivity of green pixels G is high. Transmitting light through a yellow or light yellow filter can make the spectral characteristic closer to the visual sensitivity characteristic of a human.

Figure 30:
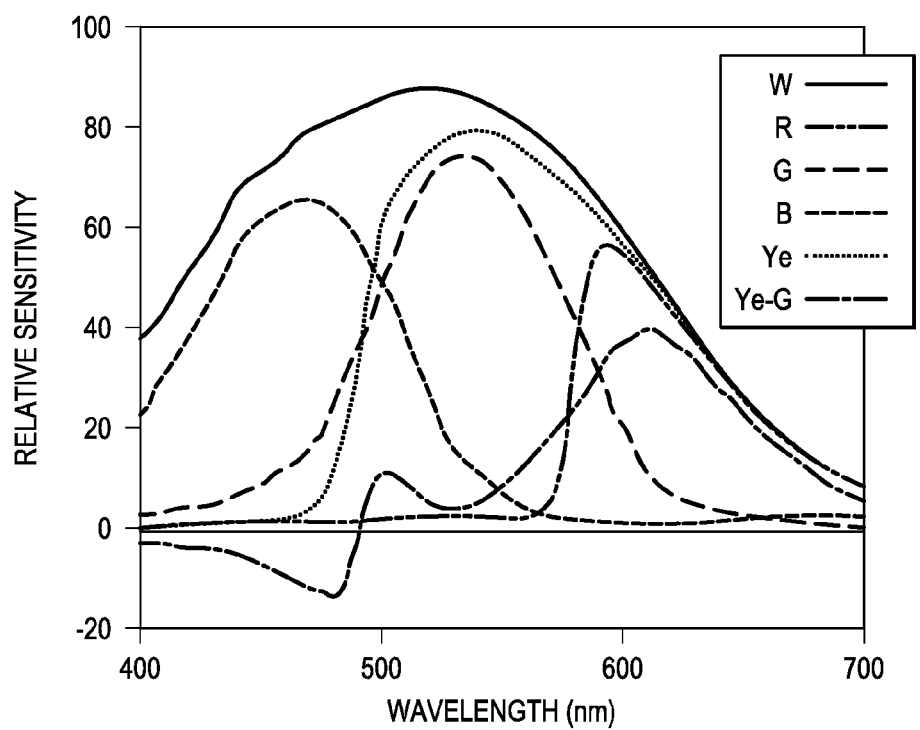
FIG. 30 shows spectral characteristic (Ye-G) obtained by subtracting the spectral sensitivity of green pixels from the spectral sensitivity of yellow pixels.

FIG. 30 shows the spectral characteristic (Ye-G) obtained by subtracting the spectral sensitivity of green pixels G from the spectral sensitivity of yellow pixels Ye. A signal close to the spectral sensitivity of red pixels is obtained by subtracting the output value of green pixels from the output value of yellow pixels. It is possible to omit red pixels and obtain a red signal by this subtraction. Thus it is possible to only use yellow pixels, green pixels and blue pixels and use more yellow pixels with high sensitivity close to the visual sensitivity characteristic as shown in FIG. 27C.

Since subtraction is preformed to obtain red information, it is also possible to realize negative sensitivity near 500 nm as illustrated in FIG. 30. Thus it is possible to produce a sensor with higher color reproducibility.

Figure 31:
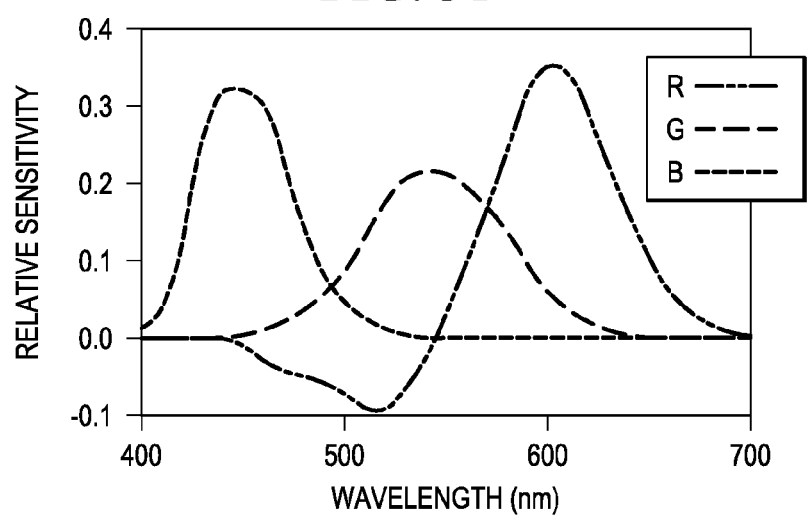
FIG. 31 shows the spectral characteristics of ideal red signals, blue signals and green signals.

FIG. 31 shows the ideal spectral characteristics of red signal R, green signal G and blue signal B. Signal (Ye-G) obtained by subtracting green pixels G from yellow pixels can be made closer to the ideal spectral characteristic of a red signal by optimizing the spectral characteristic of the yellow.

Figure 32:
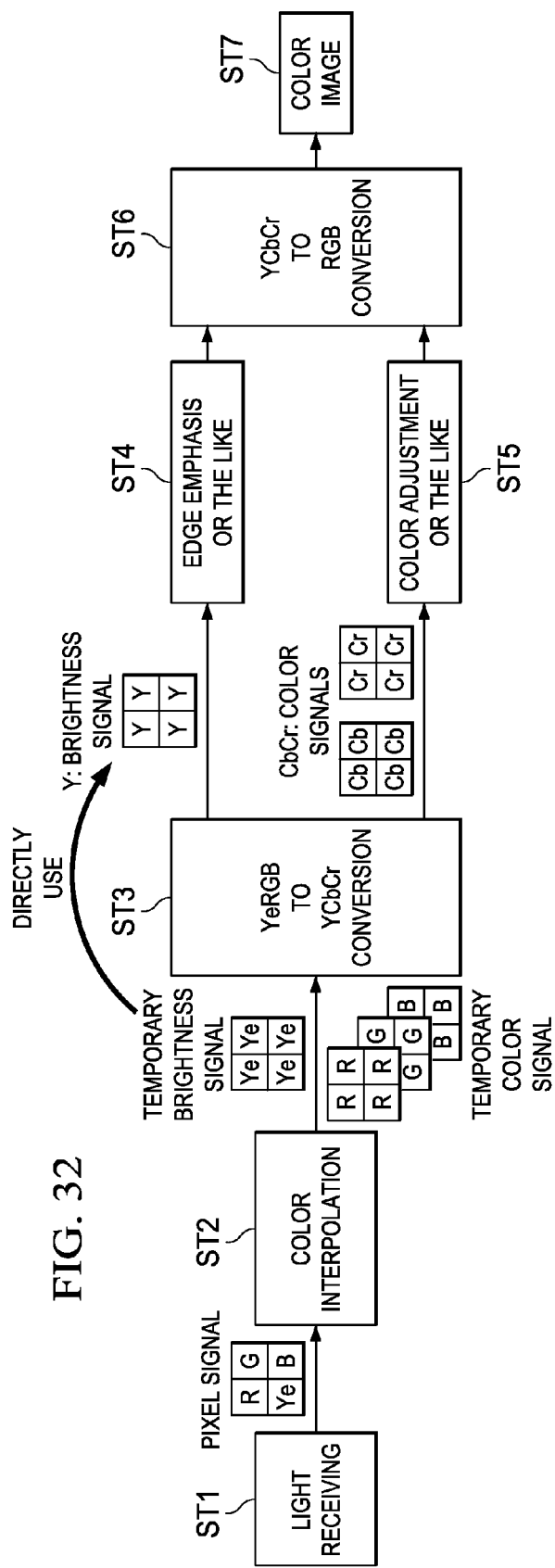
FIG. 32 is a schematic diagram illustrating the flow of information in a color image by processing image data from signals obtained from white pixels, red pixels, green pixels and blue pixels in the CMOS image sensor of the seventh embodiment of the present invention.
Figure 33:
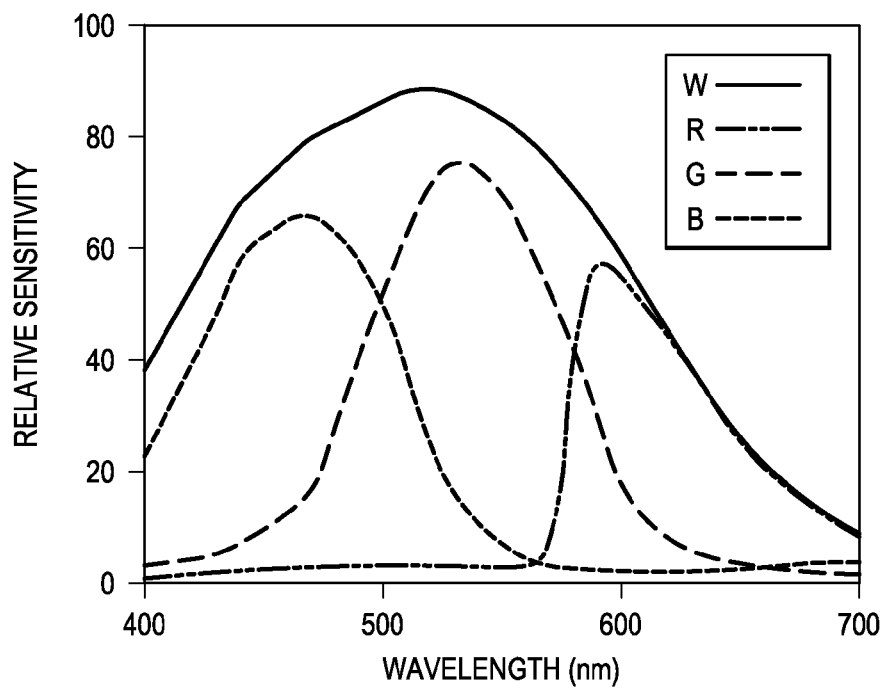
FIG. 33 shows the spectral sensitivity of the CMOS image sensor versus wavelength of a conventional example.
Figure 34:
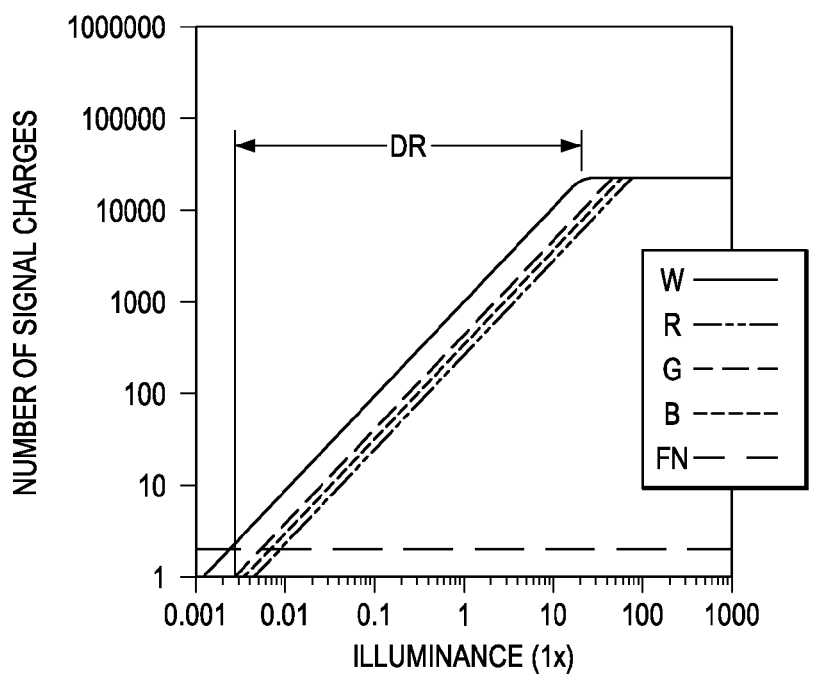
FIG. 34 shows an output characteristic illustrating the logarithm (ordinate) of the number of signal charges with respect to the logarithm (abscissa) of the luminance of the CMOS image sensor in a conventional example.

FIG. 32 is a schematic diagram illustrating the flow of information in color image processing image data from signals obtained from yellow pixels, red pixels, green pixels and blue pixels in the CMOS image sensor disclosed in this embodiment.

Step ST1 receives light in yellow pixels Ye, red pixels R, green pixels G and blue pixels B having the configuration noted above.

Step ST2 interpolates the color of each pixel signal to obtain temporary brightness signal (Ye) and temporary color signals (R, G, B).

Step ST3 converts the YeRGB signals into YCbCr signals. Step ST3 converts temporary brightness signal Ye into brightness signal Y. Step ST3 also converts the temporary color signals RGB into color signals CbCr.

Step ST4 carries out edge emphasis for brightness signal Y and other data processing. Step ST5 carries out color adjustment for color signals CbCr and other data processing.

This produces image data composed of brightness signal Y and color signals CbCr.

Step ST6 converts the image data composed of brightness signal Y and color signals CbCr into RGB data for reproduction in a reproduction device.

Step ST7 supplies the RGB data to a reproduction device that can produce a color image.

As the solid-state image pickup device of this embodiment, the CMOS image sensor has yellow pixels having a yellow color filter and at least red pixels, blue pixels or green pixels having corresponding color filters. An additional capacitance whose capacitance can be separated from the floating diffusion is included in at least the yellow pixels to expand the dynamic range. This solves the problem of a limited dynamic range in the high luminance region.

As described above, the following effects can be realized by the CMOS image sensor disclosed in the embodiments.

A higher quantum efficiency of about +6 to 9 dB and high sensitivity can be realized by adding white pixels with high transmissivity. A conventional CMOS sensor having pixels with four transistors sacrifices the high luminance region and thus the dynamic range is no different from that of a conventional RGB sensor.

In the CMOS sensor of the present invention, the dynamic range can be expanded in both the low luminance and high luminance regions by adding white pixels having an additional capacitance with an expanded dynamic range in the high luminance region.

Table 1 shows the dynamic range of a conventional CMOS image sensor having red pixels, green pixels and blue pixels as 80 dB. The sensitivity can be improved by +6 dB on the low luminance region by simply adding white pixels. This reduces the sensitivity on the high luminance region by −6 dB. The sensitivity region is simply shifted and the dynamic range remains 80 dB.

When white pixels having an additional capacitance with an expanded dynamic range in the high luminance region are included according to the present invention, the sensitivity can be improved by +6 dB on the low luminance region and by +14 dB on the high luminance region. The dynamic range is thus expanded to 100 dB.

The dynamic range can be further expanded to 106 dB by adjusting the capacitance of the additional capacitance as described in the second embodiment.

TABLE 1

|  | Conventional RGB | Conventional RGBW | RGBW of this invention | RGBW with adjusted capacitance of this invention |
| --- | --- | --- | --- | --- |
| Low luminance region | ±0 | +6 dB | +6 dB | +6 dB |
| High luminance region | ±0 | −6 dB | +14 dB | +20 dB |
| Dynamic range | 80 dB | 80 dB | 100 dB | 106 dB |

The present invention is not limited to the aforementioned description.

For example, the capacitance ratio between the floating diffusion and the additional capacitance can be appropriately selected corresponding to the design. The additional capacitance may be formed by setting two electrodes opposite each other via an insulating film.

White pixels can be replaced by appropriate yellow pixels.

In the seventh embodiment, there is no need to use all red pixels, blue pixels and green pixels. They can be appropriately replaced by white pixels or yellow pixels corresponding to signals obtained from calculation.

Other modifications are also possible without deviating from the gist of the present invention.

POSSIBLE APPLICATIONS IN INDUSTRIAL FIELDS

The solid-state image pickup device disclosed in the present invention can be applied to a CMOS image sensor or CCD image sensor used in a digital camera or camera-incorporated cellular phone or other image sensors for which a wide dynamic range is desired.

What is claimed is:

1. A solid-state image pickup device comprising:
a light receiving surface of a semiconductor substrate having an array of pixels, said array of pixels including white pixels having no color filter and red, green and blue pixels having corresponding red, green and blue color filters;
said white pixels include:
a photodiode generating and accumulating photocharges corresponding to received light,
a floating diffusion,
a transfer transistor having a source-drain path connected between said photodiode and said floating diffusion and a gate receiving a transfer drive signal, said transfer transistor selectively coupling said photodiode and said floating diffusion to transfer photocharges from said photodiode to said floating diffusion or isolating said photodiode and said floating diffusion dependent upon a digital state of said transfer drive signal,
an additional capacitance,
a capacitance-coupling transistor having a source-drain path connected between said floating diffusion and said additional capacitance and a gate receiving a capacitance-coupling drive signal, said capacitance-coupling transistor selectively coupling said floating diffusion to said additional capacitance to share charge or isolating said floating diffusion from said additional capacitance dependent upon a digital state of said capacitance-coupling drive signal.

2. The solid-state image pickup device of claim 1, wherein:
said red, green and blue pixels each include:
  a second photodiode generating and accumulating photocharges corresponding to received light,
  a second floating diffusion,
  a second transfer transistor having a source-drain path connected between said photodiode and said floating diffusion and a gate receiving a second transfer drive signal, said second transfer transistor selectively coupling said second photodiode and said second floating diffusion to transfer photocharges from said second photodiode to said second floating diffusion or isolating said second photodiode and said second floating diffusion dependent upon a digital state of said second transfer drive signal,
  a second additional capacitance,
  a second capacitance-coupling transistor having a source-drain path connected between said second floating diffusion and said second additional capacitance and a gate receiving said capacitance-coupling drive signal, said capacitance-coupling transistor selectively coupling said second floating diffusion to said second additional capacitance to share charge or isolating said second floating diffusion from said second additional capacitance dependent upon a digital state of said capacitance-coupling drive signal.

3. The solid-state image pickup device of claim 2, wherein:
said additional capacitance of said white pixels include a larger capacitance than said second additional capacitance of said red, green and blue pixels.

4. The solid-state image pickup device of claim 1, wherein:
said light receiving surface includes a central area and a peripheral area, a proportion of said white pixels to all pixels in said peripheral area is higher than a proportion of said white pixels to all pixels in said central area.

5. A solid-state image pickup device comprising:
a light receiving surface of a semiconductor substrate having an array of pixels, said array of pixels including white pixels having no color filter and red, green and blue pixels having corresponding red, green and blue color filters;
said white pixels include:
  a first photodiode generating and accumulating photocharges corresponding to received light,
  a floating diffusion,
  a first transfer transistor having a source-drain path connected between said photodiode and said floating diffusion and a gate receiving a first transfer drive signal, said transfer transistor selectively coupling said photodiode and said floating diffusion to transfer photocharges from said photodiode to said floating diffusion or isolating said photodiode and said floating diffusion dependent upon a digital state of said first transfer drive signal,
  an additional capacitance,
  a capacitance-coupling transistor having a source-drain path connected between said floating diffusion and said additional capacitance and a gate receiving a capacitance-coupling drive signal, said capacitance-coupling transistor selectively coupling said floating diffusion to said additional capacitance to share charge or isolating said floating diffusion from said additional capacitance dependent upon a digital state of said capacitance-coupling drive signal; and
each white pixel having a corresponding at least one red, green and blue pixels, each of said corresponding at least one red, green and blue pixels including:
  a second photodiode generating and accumulating photocharges corresponding to received light,
  a second transfer transistor having a source-drain path connected between said second photodiode and said floating diffusion and a gate receiving a second transfer drive signal, said second transfer transistor selectively coupling said second photodiode and said floating diffusion to transfer photocharges from said second photodiode to said floating diffusion or isolating said second photodiode and said floating diffusion dependent upon a digital state of said second transfer drive signal.

6. A solid-state image pickup device comprising:
a light receiving surface of a semiconductor substrate having an array of pixels, said array of pixels including yellow pixels having a yellow color filter and red, green and blue pixels having corresponding red, green and blue color filters;
said yellow pixels include:
  a photodiode generating and accumulating photocharges corresponding to received light,
  a floating diffusion,
  a transfer transistor having a source-drain path connected between said photodiode and said floating diffusion and a gate receiving a transfer drive signal, said transfer transistor selectively coupling said photodiode and said floating diffusion to transfer photocharges from said photodiode to said floating diffusion or isolating said photodiode and said floating diffusion dependent upon a digital state of said transfer drive signal,
  an additional capacitance,
  a capacitance-coupling transistor having a source-drain path connected between said floating diffusion and said additional capacitance and a gate receiving a capacitance-coupling drive signal, said capacitance-coupling transistor selectively coupling said floating diffusion to said additional capacitance to share charge or isolating said floating diffusion from said additional capacitance dependent upon a digital state of said capacitance-coupling drive signal.

7. The solid-state image pickup device of claim 6, wherein:
said red, green and blue pixels each include:
  a second photodiode generating and accumulating photocharges corresponding to received light,
  a second floating diffusion,
  a second transfer transistor having a source-drain path connected between said photodiode and said floating diffusion and a gate receiving a second transfer drive signal, said second transfer transistor selectively coupling said second photodiode and said second floating diffusion to transfer photocharges from said second photodiode to said second floating diffusion or isolating said second photodiode and said second floating diffusion dependent upon a digital state of said second transfer drive signal,
  a second additional capacitance,
  a second capacitance-coupling transistor having a source-drain path connected between said second floating diffusion and said second additional capacitance and a gate receiving said capacitance-coupling drive signal, said capacitance-coupling transistor selectively coupling said second floating diffusion to said second additional capacitance to share charge or isolating said second floating diffusion from said second additional capacitance dependent upon a digital state of said capacitance-coupling drive signal.

8. The solid-state image pickup device of claim 7, wherein:
said additional capacitance of said yellow pixels include a larger capacitance than said second additional capacitance of said red, green and blue pixels.

9. The solid-state image pickup device of claim 6, wherein:
said light receiving surface includes a central area and a peripheral area, a proportion of said yellow pixels to all pixels in said peripheral area is higher than a proportion of said yellow pixels to all pixels in said central area.

10. A solid-state image pickup device comprising:
a light receiving surface of a semiconductor substrate having an array of pixels, said array of pixels including yellow pixels having a yellow color filter and red, green and blue pixels having corresponding red, green and blue color filters;
said yellow pixels include:
  a first photodiode generating and accumulating photocharges corresponding to received light,
  a floating diffusion,
  a first transfer transistor having a source-drain path connected between said photodiode and said floating diffusion and a gate receiving a first transfer drive signal, said transfer transistor selectively coupling said photodiode and said floating diffusion to transfer photocharges from said photodiode to said floating diffusion or isolating said photodiode and said floating diffusion dependent upon a digital state of said first transfer drive signal,
  an additional capacitance,
  a capacitance-coupling transistor having a source-drain path connected between said floating diffusion and said additional capacitance and a gate receiving a capacitance-coupling drive signal, said capacitance-coupling transistor selectively coupling said floating diffusion to said additional capacitance to share charge or isolating said floating diffusion from said additional capacitance dependent upon a digital state of said capacitance-coupling drive signal; and
each yellow pixel having a corresponding at least one red, green and blue pixels, each of said corresponding at least one red, green and blue pixels including:
  a second photodiode generating and accumulating photocharges corresponding to received light,
  a second transfer transistor having a source-drain path connected between said second photodiode and said floating diffusion and a gate receiving a second transfer drive signal, said second transfer transistor selectively coupling said second photodiode and said floating diffusion to transfer photocharges from said second photodiode to said floating diffusion or isolating said second photodiode and said floating diffusion dependent upon a digital state of said second transfer drive signal.

\* \* \* \* \*